US012670849B2

(12) United States Patent
Seo et al.

(10) Patent No.: US 12,670,849 B2
(45) Date of Patent: Jun. 30, 2026

(54) DISPLAY PANEL AND DISPLAY DEVICE INCLUDING THE DISPLAY PANEL WITH REDUCED POWER CONSUMPTION

(71) Applicant: Samsung Display Co., LTD., Yongin-si (KR)

(72) Inventors: Hae-Kwan Seo, Yongin-si (KR); Bon-Seog Gu, Yongin-si (KR); Jiyoun Kim, Yongin-si (KR); Jinyoung Roh, Yongin-si (KR); Jaekeun Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/014,989

(22) Filed: Jan. 9, 2025

(65) Prior Publication Data

US 2025/0239213 A1 Jul. 24, 2025

(30) Foreign Application Priority Data

Jan. 24, 2024 (KR) ........................ 10-2024-0010717

(51) Int. Cl.
*G09G 3/32* (2016.01)

(52) U.S. Cl.
CPC ....... *G09G 3/32* (2013.01); *G09G 2300/0426* (2013.01); *G09G 2300/0804* (2013.01); *G09G 2300/0819* (2013.01); *G09G 2300/0842* (2013.01); *G09G 2310/08* (2013.01); *G09G 2320/0666* (2013.01); *G09G 2330/023* (2013.01)

(58) Field of Classification Search
CPC ............. G09G 3/32; G09G 2300/0426; G09G 2300/0804; G09G 2300/0819; G09G 2300/0842; G09G 2310/08; G09G 2320/0666; G09G 2330/023
See application file for complete search history.

(56) References Cited

U.S. PATENT DOCUMENTS

| | | | |
|---|---|---|---|
| 9,990,889 | B2 | 6/2018 | Song et al. |
| 11,574,578 | B2 | 2/2023 | Yang et al. |
| 11,609,381 | B2 | 3/2023 | Altshuler et al. |

(Continued)

FOREIGN PATENT DOCUMENTS

| | | | |
|---|---|---|---|
| JP | 2023031242 | A | 3/2023 |
| KR | 102263258 | B1 | 6/2021 |

(Continued)

*Primary Examiner* — Kwang-Su Yang
(74) *Attorney, Agent, or Firm* — CANTOR COLBURN LLP

(57) ABSTRACT

A display panel which includes a first data line through a fourth data line, a first pixel circuit through a fourth pixel circuit connected to the first data line through the fourth data line, respectively, and a first light emitting element to a fourth light emitting element connected to the first pixel circuit through the fourth pixel circuit, respectively. The first data line and the fourth data line each transfer a first color data signal, the second data line transfers a second color data signal, and the third data line transfers a third color data signal. The first light emitting element and the fourth light emitting element emit light of a first color, the second light emitting element emits light of a second color, and the third light emitting element emits light of a third color.

20 Claims, 21 Drawing Sheets

(56) References Cited

U.S. PATENT DOCUMENTS

| | | | | |
|---|---|---|---|---|
| 11,800,748 | B2 | 10/2023 | Nam et al. | |
| 11,935,453 | B2 | 3/2024 | Park et al. | |
| 2022/0045151 | A1* | 2/2022 | Jeong | H10K 59/123 |
| 2022/0115478 | A1* | 4/2022 | Nam | H10K 59/35 |
| 2022/0320189 | A1* | 10/2022 | Lee | H10K 59/121 |
| 2022/0366828 | A1* | 11/2022 | Park | G09G 3/2003 |
| 2023/0326405 | A1 | 10/2023 | Seo et al. | |

FOREIGN PATENT DOCUMENTS

| | | | |
|---|---|---|---|
| KR | 1020220048519 | A | 4/2022 |
| KR | 1020220156147 | A | 11/2022 |
| KR | 102482983 | B1 | 12/2022 |

* cited by examiner

DISPLAY PANEL AND DISPLAY DEVICE INCLUDING THE DISPLAY PANEL WITH REDUCED POWER CONSUMPTION

This application claims priority to Korean Patent Application No. 10-2024-0010717, filed on Jan. 24, 2024, and all the benefits accruing therefrom under 35 U.S.C. § 119, the content of which in its entirety is herein incorporated by reference.

BACKGROUND

Field

Embodiments of the present disclosure described herein relate to a display device.

Description of the Related Art

In general, a display device includes a display panel for displaying an image and a driving circuit for driving the display panel. The display panel may include a plurality of scan lines, a plurality of data lines, and a plurality of pixels. The driving circuit may include a data driving circuit that outputs a data driving signal to the data lines, a scan driving circuit that outputs a scan signal for driving the scan lines, and a driving controller that controls the data driving circuit and the scan driving circuit.

The display device may display an image by outputting a scan signal to a scan line connected with a pixel that is to display the image and providing a data voltage corresponding to the display image to a data line connected with the pixel.

Each of the plurality of pixels may provide light of one of various colors, such as, for example, red light, green light, and blue light. Each of the plurality of pixels may include a light emitting element and a pixel circuit for driving the light emitting element. The plurality of pixels may be of various sizes and may be arranged in various ways.

SUMMARY

Embodiments of the present disclosure provide a display device with reduced power consumption.

According to an embodiment, a display panel includes a first data line through a fourth data line, a first pixel circuit through a fourth pixel circuit connected to the first data line through the fourth data line, respectively, and a first light emitting element to a fourth light emitting element connected to the first pixel circuit through the fourth pixel circuit, respectively. Each of the first data line and the fourth data line transfers a first color data signal, the second data line transfers a second color data signal, and the third data line transfers a third color data signal. The first light emitting element and the fourth light emitting element emit light of a first color, the second light emitting element emits light of a second color, and the third light emitting element emits light of a third color. The third light emitting element, the first light emitting element, the second light emitting element, and the fourth light emitting element are sequentially arranged in a first direction.

The first light emitting element through the fourth light emitting element may include a first extending line through a fourth extending line, respectively, and the first extending line through the fourth extending line may be connected to the first pixel circuit through the fourth pixel circuit through a first contact hole through a fourth contact hole, respectively.

The second contact hole and the third contact hole may be disposed between the second light emitting element and the third light emitting element.

Each of the first light emitting element through the fourth light emitting element may include an anode and a cathode, and the first extending line through the fourth extending line may extend from the anodes of the first light emitting element through the fourth light emitting element, respectively.

The first extending line, the second extending line, and the fourth extending line may extend from the first light emitting element, the second light emitting element, and the fourth light emitting element, respectively, in a direction opposite to the first direction, and the third extending line may extend from the third light emitting element in the first direction.

The first data line and the second data line may be disposed adjacent to each other, and the first contact hole may be disposed between the first data line and the second data line.

The display panel may further include a demultiplexer that connects a first output line and a second output line to the first data line and the fourth data line, respectively, in response to a first switching signal and connect the first output line and the second output line to the second data line and the third data line, respectively, in response to a second switching signal.

The display panel may further include a demultiplexer that selectively connects a first output line, a second output line, and a third output line to the first data line through the fourth data line. The demultiplexer may connect the first output line and the third output line to the first data line and the fourth data line, may connect the second output line to the second data line in response to a first switching signal, and may connect the second output line to the third data line in response to a second switching signal.

The first pixel circuit may include a first transistor including a first electrode, a second electrode, and a gate electrode, a sixth transistor including a first electrode connected with the second electrode of the first transistor, a second electrode, and a gate electrode connected with an emission control line, and a connecting line that connects the first contact hole and the second electrode of the sixth transistor.

The display panel may include a base layer, a circuit element layer that is disposed on the base layer and that includes the first pixel circuit, the connecting line, and a connecting electrode disposed on the connecting line, and a display element layer that is disposed on the circuit element layer and that includes the first light emitting element. The connecting line may be disposed on the second electrode of the sixth transistor and may be electrically connected to the second electrode of the sixth transistor. The connecting electrode may be disposed on the connecting line and may be connected with the connecting line. The first light emitting element may be connected with the connecting line through the first contact hole.

The second pixel circuit may include a first transistor including a first electrode, a second electrode, and a gate electrode, a sixth transistor including a first electrode connected with the second electrode of the first transistor, a second electrode, and a gate electrode connected with an emission control line, and a connecting line that connects the second contact hole and the second electrode of the sixth transistor.

The display panel may include a base layer, a circuit element layer that is disposed on the base layer and that includes the second pixel circuit, the connecting line, and a connecting electrode disposed on the connecting line, and a display element layer that is disposed on the circuit element layer and that includes the second light emitting element. The connecting line may be disposed on the second electrode of the sixth transistor and may be electrically connected to the second electrode of the sixth transistor. The connecting electrode may be disposed on the connecting line and may be connected with the connecting line. The second light emitting element may be connected with the connecting line through the second contact hole.

According to an embodiment, an electronic device includes a display panel and a data driving circuit electrically connected with the display panel. The display panel includes a first data line through a fourth data line, a first pixel circuit through a fourth pixel circuit connected to the first data line through the fourth data line, respectively, and a first light emitting element through a fourth light emitting element connected to the first pixel circuit through the fourth pixel circuit, respectively. The data driving circuit provides a first color data signal to each of the first data line and the fourth data line, provides a second color data signal to the second data line, and provides a third color data signal to the third data line. The first light emitting element and the fourth light emitting element emit light of a first color, the second light emitting element emits light of a second color, and the third light emitting element emits light of a third color. The third light emitting element, the first light emitting element, the second light emitting element, and the fourth light emitting element are sequentially arranged in a first direction.

The first light emitting element through the fourth light emitting element may include a first extending line through a fourth extending line, respectively, and the first extending line through the fourth extending line may be connected to the first pixel circuit through the fourth pixel circuit through a first contact hole through a fourth contact hole, respectively.

The first contact hole may be disposed between the first data line and the second data line, and the second contact hole and the third contact hole may be disposed between the second light emitting element and the third light emitting element.

The first extending line, the second extending line, and the fourth extending line may extend from the first light emitting element, the second light emitting element, and the fourth light emitting element, respectively, in a direction opposite to the first direction, and the third extending line may extend from the third light emitting element in the first direction.

According to an embodiment, a display device includes a display panel including a first data line through a fourth data line, a data driving circuit electrically connected with a first output line and a second output line, and a demultiplexer that connects the first output line and the second output line to the first data line and the fourth data line in response to a first switching signal and connects the first output line and the second output line to the second data line and the third data line in response to a second switching signal. The display panel includes a first pixel circuit through a fourth pixel circuit connected to the first data line through the fourth data line, respectively, and a first light emitting element to a fourth light emitting element connected to the first pixel circuit through the fourth pixel circuit, respectively. Each of the first data line and the fourth data line transfers a first color data signal, the second data line transfers a second color data signal, and the third data line transfers a third color data signal. The first light emitting element and the fourth light emitting element emit light of a first color, the second light emitting element emits light of a second color, and the third light emitting element emits light of a third color. The third light emitting element, the first light emitting element, the second light emitting element, and the fourth light emitting element are sequentially arranged in a first direction.

The data driving circuit may output the first color data signal to the first output line and the second output line when the first switching signal is at an activation level, and the data driving circuit may output the second color data signal and the third color data signal to the first output line and the second output line, respectively, when the second switching signal is at an activation level.

The first light emitting element through the fourth light emitting element may include a first extending line through a fourth extending line, respectively. The first extending line through the fourth extending line may be connected to the first pixel circuit through the fourth pixel circuit through a first contact hole through a fourth contact hole, respectively. The second contact hole and the third contact hole may be disposed between the second light emitting element and the third light emitting element.

The first data line and the second data line may be disposed adjacent to each other, and the first contact hole may be disposed between the first data line and the second data line.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
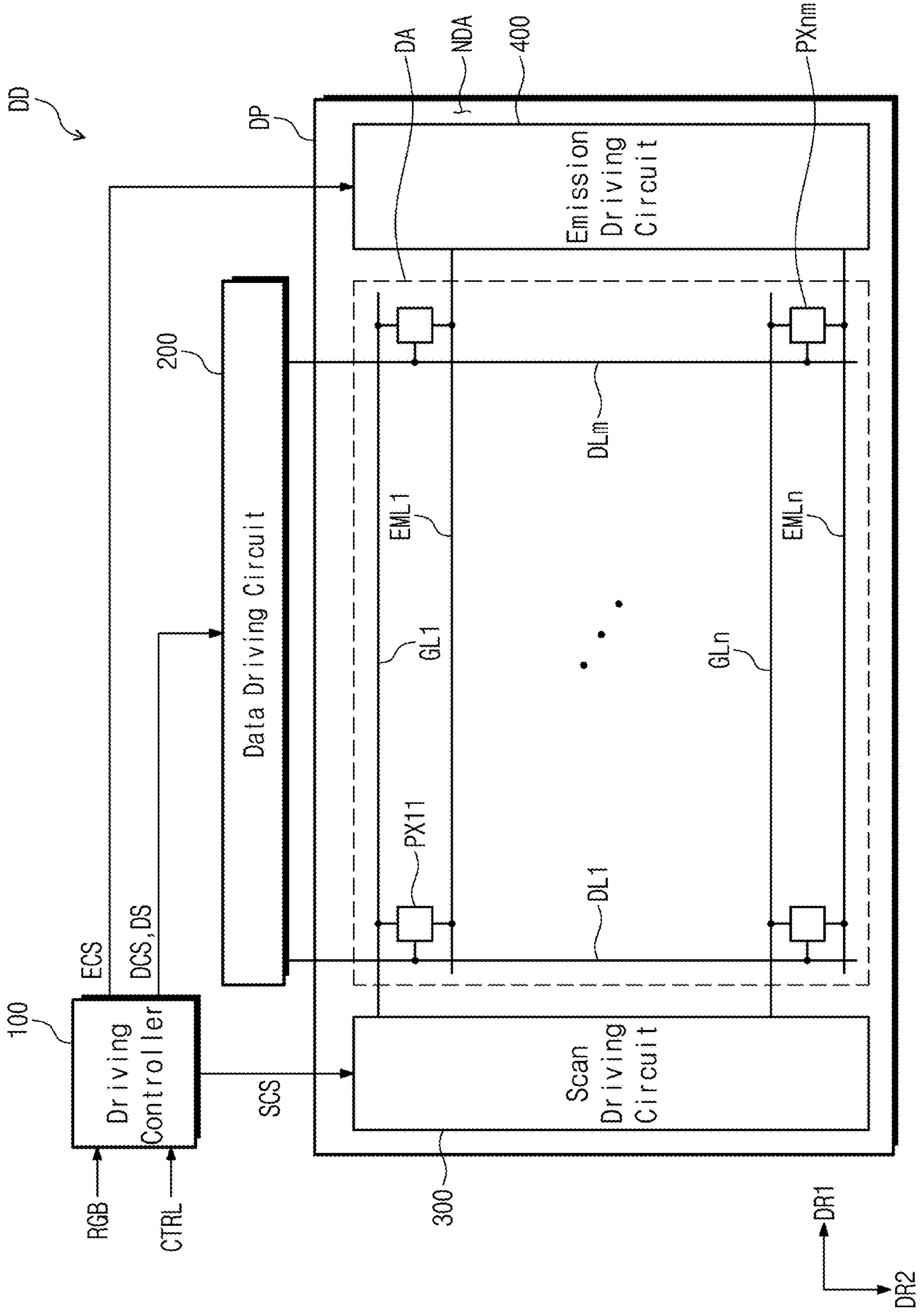
FIG. 1 is a block diagram of a display device according to an embodiment of the present disclosure.

In this specification, when it is described that a component (or, an area, a layer, a part, or the like) is referred to as being "on", "connected to" or "coupled to" another component, this means that the component may be directly on, connected to, or coupled to the other component or a third component may be present therebetween.

Identical reference numerals refer to identical components. In some aspects, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms as used herein may distinguish one component from other components. For example, without departing the scope of the present disclosure, a first component may be referred to as a second component, and similarly, the second component may also be referred to as the first component. The terms of a singular form may include plural forms unless otherwise specified.

In some aspects, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

The term "substantially," as used herein, means approximately or actually. The term "substantially equal" means approximately or actually equal. The term "substantially the same" means approximately or actually the same.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a block diagram of a display device according to an embodiment of the present disclosure.

Referring to FIG. 1, the display device DD includes a driving controller 100, a data driving circuit 200, and a display panel DP.

The driving controller 100 receives an input image signal RGB and a control signal CTRL. The driving controller 100 generates an output image signal DS by converting the input image signal RGB into an image type appropriate for the display panel DP. The driving controller 100 outputs a scan control signal SCS and a data control signal DCS.

The display panel DP according to an embodiment of the present disclosure may be an emissive display panel. For example, the display panel DP may be an organic light emitting display panel, an inorganic light emitting display panel, or a quantum-dot light emitting display panel. An emissive layer of the organic light emitting display panel may include an organic luminescent material. An emissive layer of the inorganic light emitting display panel may include an inorganic luminescent material. An emissive layer of the quantum-dot light emitting display panel may include quantum dots and quantum rods. Hereinafter, an example in which the display panel DP is an organic light emitting display panel will be described herein.

The display panel DP includes scan lines GL1 to GLn, data lines DL1 to DLm, and pixels PX11 to PXnm.

The display panel DP includes a display area DA and a non-display area NDA. In an embodiment, the display area DA has a quadrangular shape. However, embodiments of the present disclosure are not limited thereto. The non-display area NDA may be in the form of a frame that surrounds the display area DA.

The display panel DP may further include a scan driving circuit 300 and an emission driving circuit 400. The pixels PX11 to PXnm may be disposed in the display area DA, and the scan driving circuit 300 and the emission driving circuit 400 may be disposed in the non-display area NDA.

The scan lines GL1 to GLn extend from the scan driving circuit 300 in a first direction DR1 and are arranged in the second direction DR2 such that the scan lines GL1 to GLn are spaced apart from one another. Emission control lines EML1 to EMLn extend from the emission driving circuit 400 in the direction opposite to the first direction DR1 and are arranged in the second direction DR2 such that the emission control lines EML1 to EMLn are spaced apart from one another. The data lines DL1 to DLm extend from the data driving circuit 200 in the second direction DR2 and are arranged in the first direction DR1 such that the data lines DL1 to DLm are spaced apart from one another.

Each of the pixels PX11 to PXnm may be connected with a corresponding scan line among the scan lines GL1 to GLn, a corresponding data line among the data lines DL1 to DLm, and a corresponding emission control line among the emission control lines EML1 to EMLn. In FIG. 1, each of the plurality of pixels PX11 to PXnm is illustrated as being connected with one scan line. However, embodiments of the present disclosure are not limited thereto. Each of the plurality of pixels PX11 to PXnm may be electrically connected with two or more scan lines.

Each of the pixels PX11 to PXnm may include a light emitting element and a pixel circuit that controls light emission of the light emitting element. The light emitting element and the pixel circuit will be described herein in detail.

The data driving circuit 200 receives the data control signal DCS and the output image signal DS from the driving controller 100. The data driving circuit 200 converts the output image signal DS into first to third color data signals and outputs the first to third color data signals to the data lines DL1 to DLm. Each of the first to third color data signals may have a voltage level corresponding to the grayscale level of the output image signal DS.

The data driving circuit 200 may be implemented with an integrated circuit (IC). The data driving circuit 200 may be directly mounted in a certain area of the display panel DP. Alternatively, the data driving circuit 200 may be mounted on a separate printed circuit board in a chip on film (COF) manner and may be electrically connected with the display panel DP. In an embodiment, the data driving circuit 200 may be formed on the display panel DP through the same process as the formation process of the pixel circuit of each of the pixels PX11 to PXnm.

The scan driving circuit 300 receives the scan control signal SCS from the driving controller 100. The scan driving circuit 300 may output scan signals to the scan lines GL1 to GLn in response to the scan control signal SCS. In an embodiment, the scan driving circuit 300 may be formed through the same process as the formation process of the pixel circuit of each of the pixels PX11 to PXnm.

The emission driving circuit 400 receives an emission driving signal ECS from the driving controller 100. The emission driving circuit 400 may output emission control signals to the emission control lines EML1 to EMLn in response to the emission driving signal ECS. In an embodiment, the emission driving circuit 400 may be formed through the same process as the formation process of the pixel circuit of each of the pixels PX11 to PXnm. Although the emission driving circuit 400 is illustrated in FIG. 1, embodiments of the present disclosure are not limited thereto. In an embodiment, the emission driving circuit 400 may be included in the scan driving circuit 300.

The driving controller 100, the data driving circuit 200, the scan driving circuit 300, and the emission driving circuit 400 may be driving circuits for providing the first to third color data signals corresponding to the input image signal RGB to the pixels PX11 to PXnm.

Figure 2:
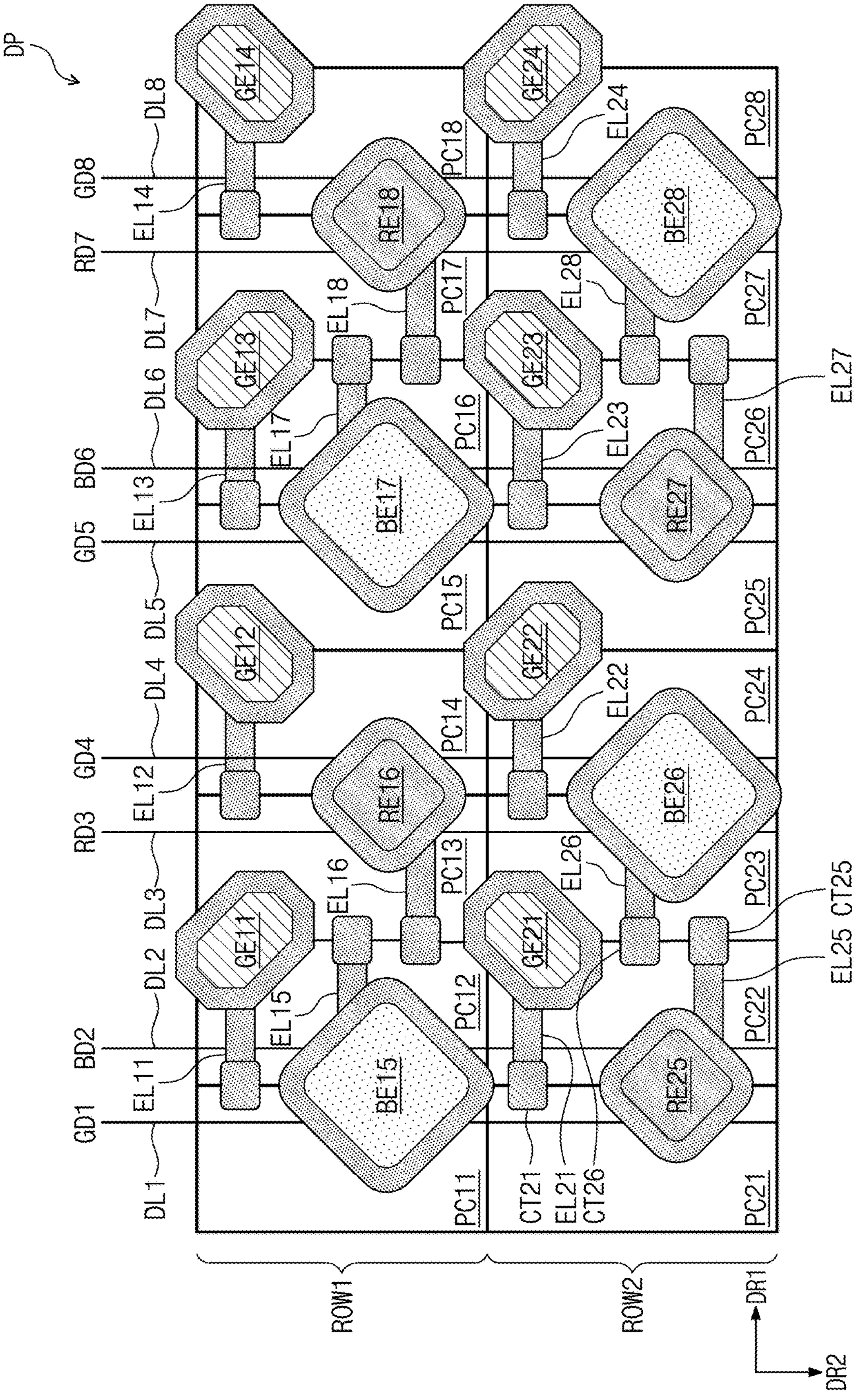
FIG. 2 is a view illustrating a display panel according to an embodiment of the present disclosure.

FIG. 2 is a view illustrating the display panel DP according to an embodiment of the present disclosure.

Referring to FIG. 2, the display panel DP includes data lines DL1 to DL8, 11$^{th}$ to 18$^{th}$ pixel circuits PC11 to PC18, 21$^{st}$ to 28$^{th}$ pixel circuits PC21 to PC28, first light emitting elements GE11 to GE14 and GE21 to GE24, second light emitting elements BE15, BE17, BE26, and BE28, and third light emitting elements RE16, RE18, RE25, and RE27. The sizes, shapes, and arrangement order of the first light emitting elements GE11 to GE14 and GE21 to GE24, the second light emitting elements BE15, BE17, BE26, and BE28, and the third light emitting elements RE16, RE18, RE25, and RE27 illustrated in FIG. 2 are merely examples for a better understanding of description, and embodiments of the present disclosure are not limited thereto.

The 11$^{th}$ to 18$^{th}$ pixel circuits PC11 to PC18 may be disposed in the first row ROW1 and may be sequentially arranged in the first direction DR1. The 21$^{st}$ to 28$^{th}$ pixel circuits PC21 to PC28 may be disposed in the second row ROW2 and may be sequentially arranged in the first direction DR1.

The data lines DL1 to DL8 extend in the second direction DR2 and are arranged in the first direction DR1 such that the data lines DL1 to DL8 are spaced apart from one another. Some of the data lines DL1 to DL8 may be arranged adjacent two by two. That is, the data lines DL1 and DL2 are disposed adjacent to each other, the data lines DL3 and DL4 are disposed adjacent to each other, the data lines DL5 and DL6 are disposed adjacent to each other, and the data lines DL7 and DL8 are disposed adjacent to each other.

Each of the 11$^{th}$ to 18$^{th}$ pixel circuits PC11 to PC18 is connected to a corresponding data line among the data lines DL1 to DL8. Each of the 21$^{st}$ to 28$^{th}$ pixel circuits PC21 to PC28 is connected to a corresponding data line among the data lines DL1 to DL8.

The first light emitting elements GE11 to GE14, the second light emitting elements BE15 and BE17, and the third light emitting elements RE16 and RE18 are disposed in the first row ROW1.

The second light emitting element BE15, the first light emitting element GE11, the third light emitting element RE16, the first light emitting element GE12, the second light emitting element BE17, the first light emitting element GE13, the third light emitting element RE18, and the first light emitting element GE14 may be sequentially arranged in the first direction DR1 in the first row ROW1.

The first light emitting elements GE21 to GE24, the second light emitting elements BE26 and BE28, and the third light emitting elements RE25 and RE27 are disposed in the second row ROW2.

The third light emitting element RE25, the first light emitting element GE21, the second light emitting element BE26, the first light emitting element GE22, the third light emitting element RE27, the first light emitting element GE23, the second light emitting element BE28, and the first light emitting element GE24 may be sequentially arranged in the first direction DR1 in the second row ROW2.

In an embodiment, each of the first light emitting elements GE11 to GE14 and GE21 to GE24 may emit light of a first color, each of the second light emitting elements BE15, BE17, BE26, and BE28 may emit light of a second color, and each of the third light emitting elements RE16, RE18, RE25, and RE27 may emit light of a third color.

In an embodiment, the light of the first color, the light of the second color, and the light of the third color may be light of different colors.

In an embodiment, the light of the first color, the light of the second color, and the light of the third color may be green light, blue light, and red light, respectively. However, embodiments of the present disclosure are not limited thereto. In an embodiment, the light of the first color, the light of the second color, and the light of the third color may be light of various colors such as, for example, white, cyan, magenta, and yellow as well as blue, green, and red.

The first light emitting elements GE11 to GE14, the second light emitting elements BE15 and BE17, and the third light emitting elements RE16 and RE18 in the first row ROW1 may each be electrically connected to a corresponding one of the 11$^{th}$ to 18$^{th}$ pixel circuits PC11 to PC18 through a corresponding one of extending lines (or, extending electrodes) EL11 to EL18. The extending lines EL11 to EL18 may extend from the first light emitting elements GE11 to GE14, the second light emitting elements BE15 and BE17, and the third light emitting elements RE16 and RE18 in the first direction DR1 or the direction opposite to the first direction DR1. For example, the extending lines EL15 and EL17 extend from the second light emitting elements BE15 and BE17 in the first direction DR1. The extending lines EL11, EL12, EL13, EL14, EL16, and EL18 extend from the first light emitting elements GE11 to GE14 and the third light emitting elements RE16 and RE18 in the direction opposite to the first direction DR1.

In an embodiment, the first light emitting elements GE11 to GE14, the second light emitting elements BE15 and BE17, and the third light emitting elements RE16 and RE18 may be electrically connected to the 11$^{th}$ to 18$^{th}$ pixel circuits PC11 to PC18 through the extending lines EL11 to EL18, respectively.

The first light emitting elements GE21 to GE24, the second light emitting elements BE26 and BE28, and the third light emitting elements RE25 and RE27 in the second row ROW2 may each be electrically connected to a corresponding one of the 21$^{st}$ to 28$^{th}$ pixel circuits PC21 to PC28 through a corresponding one of extending lines (or, extending electrodes) EL21 to EL28.

In an embodiment, the first light emitting elements GE21 to GE24 may be electrically connected to the 21$^{st}$ pixel circuit PC21, the 24$^{th}$ pixel circuit PC24, the 25$^{th}$ pixel circuit PC25 and the 28$^{th}$ pixel circuit PC28 through the extending lines EL21 to EL24, respectively.

In an embodiment, the second light emitting elements BE26 and BE28 may be electrically connected to the 22$^{nd}$ and 26$^{th}$ pixel circuits PC22 and PC26 through the extending lines EL26 and EL28, respectively. The third light emitting elements RE25 and RE27 may be electrically connected to the 23$^{rd}$ and 27$^{th}$ pixel circuits PC23 and PC27 through the extending lines EL25 and EL27, respectively.

The extending lines EL21 to EL28 may extend from the first light emitting elements GE21 to GE24, the second light emitting elements BE26 and BE28, and the third light emitting elements RE25 and RE27 in the first direction DR1 or the direction opposite to the first direction DR1. For example, the extending lines EL21 to EL28 may extend out from anodes of the first light emitting elements GE21 to GE24, the second light emitting elements BE26 and BE28, and the third light emitting elements RE25 and RE27. In an embodiment, the extending lines EL21 to EL28 may be formed integrally with or in the same process as the anodes of the first light emitting elements GE21 to GE24, the second light emitting elements BE26 and BE28, and the third light emitting elements RE25 and RE27. Hereinafter, the anodes of the first light emitting elements GE21 to GE24, the second light emitting elements BE26 and BE28, and the third light emitting elements RE25 and RE27 may be used to refer to both of the anodes and extending lines corresponding thereto. For example, the extending lines EL25 and EL27 extend from the third light emitting elements RE25 and RE27 in the first direction DR1. The extending lines EL21, EL22, EL23, EL24, EL26, and EL28 extend from the first light emitting elements GE21 to GE24 and the second light emitting elements BE26 and BE28 in the direction opposite to the first direction DR1.

For example, the first light emitting element GE21 may be electrically connected to the 21$^{st}$ pixel circuit PC21 through the extending line EL21 and a contact hole CT21. In an embodiment, the contact hole CT21 may be disposed between the data lines DL1 and DL2.

For example, the second light emitting element BE26 may be electrically connected to the 22$^{nd}$ pixel circuit PC22 through the extending line EL26 and a contact hole CT26. The third light emitting element RE25 may be electrically connected to the 23$^{rd}$ pixel circuit PC23 through the extending line EL25 and a contact hole CT25. In an embodiment, the contact holes CT25 and CT26 may be disposed between the second light emitting element BE26 and the third light emitting element RE25.

The data driving circuit 200 (refer to FIG. 1) outputs first color data signals GD1, GD4, GD5, and GD8 to the data lines DL1, DL4, DL5, and DL8, respectively, outputs second color data signals BD2 and BD6 to the data lines DL2 and DL6, respectively, and outputs third color data signals RD3 and RD7 to the data lines DL3 and DL7, respectively.

In an embodiment, each of the first color data signals GD1, GD4, GD5, and GD8 may be a green data signal, each of the second color data signals BD2 and BD6 may be a blue data signal, and each of the third color data signals RD3 and RD7 may be a red data signal.

The data driving circuit 200 may output only a data signal corresponding to a specific color to each of the data lines DL1 to DL8, and thus power consumption may be reduced.

For example, a current corresponding to the first color data signal GD1 provided to the data line DL1 may be transferred to the first light emitting elements GE11 and GE21 through the 11$^{th}$ and 21$^{st}$ pixel circuits PC11 and PC21.

A current corresponding to the second color data signal BD2 provided to the data line DL2 may be transferred to the second light emitting elements BE15 and BE26 through the 12$^{th}$ and 22$^{nd}$ pixel circuits PC12 and PC22.

A current corresponding to the third color data signal RD3 provided to the data line DL3 may be transferred to the third light emitting elements RE16 and RE25 through the 13$^{th}$ and 23$^{rd}$ pixel circuits PC13 and PC23.

A current corresponding to the first color data signal GD4 provided to the data line DL4 may be transferred to the first light emitting elements GE12 and GE22 through the 14$^{th}$ and 24$^{th}$ pixel circuits PC14 and PC24.

A current corresponding to the first color data signal GD5 provided to the data line DL5 may be transferred to the first light emitting elements GE13 and GE23 through the 15$^{th}$ and 25$^{th}$ pixel circuits PC15 and PC25.

A current corresponding to the second color data signal BD6 provided to the data line DL6 may be transferred to the second light emitting elements BE17 and BE28 through the 16$^{th}$ and 26$^{th}$ pixel circuits PC16 and PC26.

A current corresponding to the third color data signal RD7 provided to the data line DL7 may be transferred to the third light emitting elements RE18 and RE27 through the 17$^{th}$ and 27$^{th}$ pixel circuits PC17 and PC27.

A current corresponding to the first color data signal GD8 provided to the data line DL8 may be transferred to the first light emitting elements GE14 and GE24 through the 18$^{th}$ and 28$^{th}$ pixel circuits PC18 and PC28.

In FIG. 2, only some of the plurality of pixel circuits, the plurality of light emitting elements, and the plurality of data lines disposed in the display panel DP are illustrated. The plurality of pixel circuits, the plurality of light emitting elements, and the plurality of data lines disposed in the first direction DR1 and the plurality of pixel circuits, the plurality of light emitting elements, and the plurality of data lines disposed in the second direction DR2 may be repeatedly disposed in the same manner as the data lines DL1 to DL8, the 11$^{th}$ to 18$^{th}$ pixel circuits PC11 to PC18, the 21$^{st}$ to 28$^{th}$ pixel circuits PC21 to PC28, the first light emitting elements GE11 to GE14 and GE21 to GE24, the second light emitting elements BE15, BE17, BE26, and BE28, and the third light emitting elements RE16, RE18, RE25, and RE27 illustrated in FIG. 2.

Figure 3:
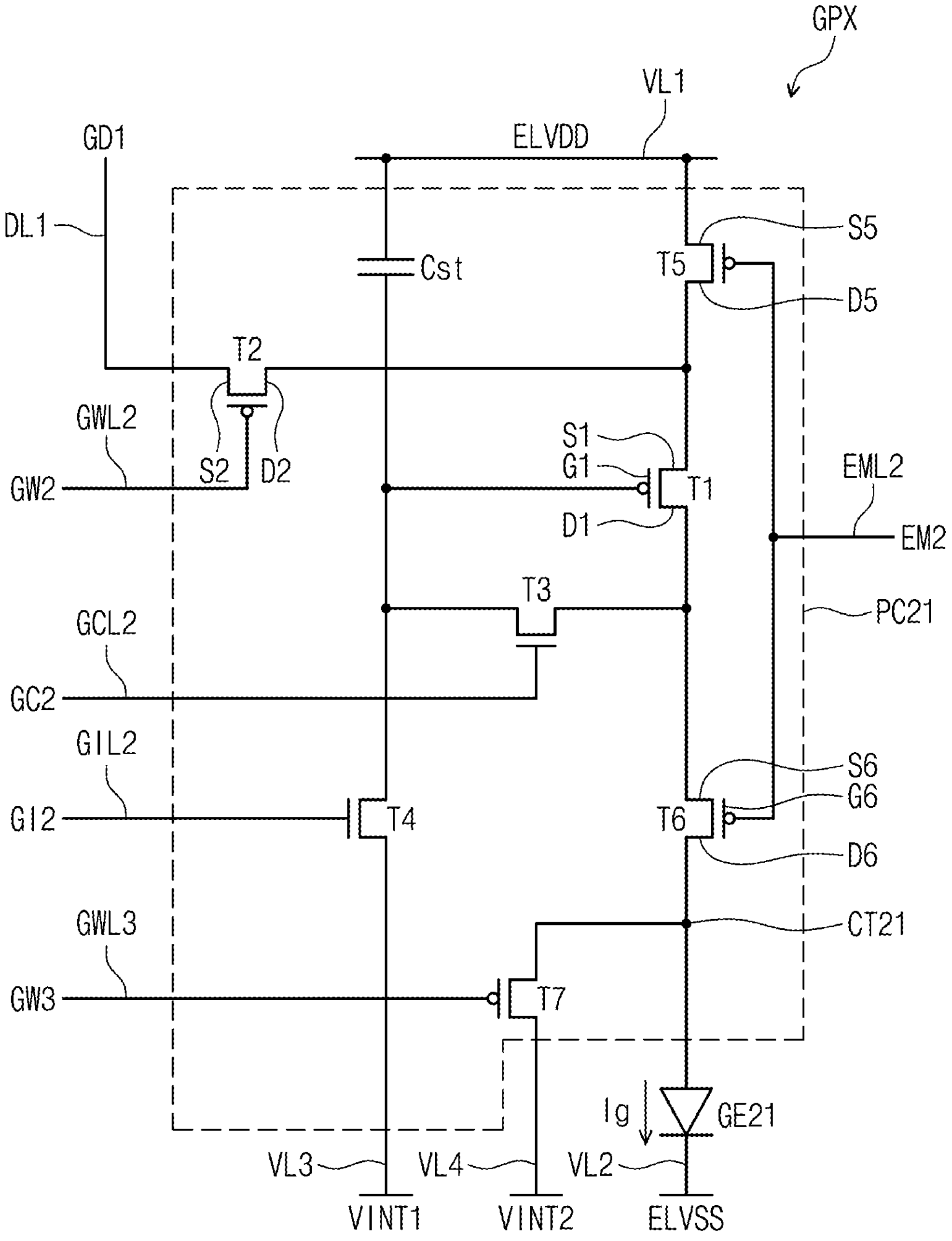
FIG. 3 is a circuit diagram of a first pixel according to an embodiment of the present disclosure.

FIG. 3 is a circuit diagram of a first pixel GPX according to an embodiment of the present disclosure. The first pixel GPX illustrated in FIG. 3 may be one of the pixels PX11 to PXnm illustrated in FIG. 1.

Referring to FIG. 3, the first pixel GPX may include the 21st pixel circuit PC21 and the first light emitting element GE21. In an embodiment, the first light emitting element GE21 may be a light emitting diode. The first light emitting element GE21 may emit the light of the first color (e.g., green light).

In an embodiment, the 21st pixel circuit PC21 may include at least one transistor and at least one capacitor. The 21st pixel circuit PC21 illustrated in FIG. 3 includes first to seventh transistors T1, T2, T3, T4, T5, T6, and T7 and a capacitor Cst. The 21st pixel circuit PC21 illustrated in FIG. 3 is an example, and various changes and modifications may be made to the configuration of the 21st pixel circuit PC21.

In this embodiment, among the first to seventh transistors T1 to T7, each of the third and fourth transistors T3 and T4 is an N-type transistor having an oxide semiconductor as a semiconductor layer, and each of the first, second, fifth, sixth, and seventh transistors T1, T2, T5, T6, and T7 is a P-type transistor having a low-temperature polycrystalline silicon (LTPS) semiconductor layer. However, embodiments of the present disclosure are not limited thereto. In an embodiment, the first to seventh transistors T1 to T7 may all be P-type transistors or N-type transistors. In an embodiment, at least one of the first to seventh transistors T1 to T7 may be an N-type transistor, and the rest may be P-type transistors.

In an embodiment, the 21st pixel circuit PC21 may be electrically connected to one data line DL1, four scan lines GIL2, GCL2, GWL2, and GWL3, and one emission control line EML2. Each of the scan lines GL1 to GLn illustrated in FIG. 1 may include a plurality of scan lines. In an embodiment, the scan line GL1 illustrated in FIG. 1 may include four scan lines GIL2, GCL2, GWL2, and GWL3.

The scan lines GIL2, GCL2, GWL2, and GWL3 may transfer scan signals GI2, GC2, GW2, and GW3, respectively, and the emission control line EML2 may transfer an emission control signal EM2. The data line DL1 transfers a first color data signal GD1. The first color data signal GD1 may have a voltage level corresponding to the input image signal RGB input to the display device DD (refer to FIG. 1). First to fourth driving voltage lines VL1, VL2, VL3, and VL4 may transfer a first driving voltage ELVDD, a second driving voltage ELVSS, a first initialization voltage VINT1, and a second initialization voltage VINT2, respectively.

The first transistor T1 includes a first electrode S1 connected with the first driving voltage line VL1 via the fifth transistor T5, a second electrode D1, and a gate electrode G1 connected with one end of the capacitor Cst.

The second transistor T2 includes a first electrode S2 connected with the data line DL1, a second electrode D2 connected with the first electrode S1 of the first transistor T1, and a gate electrode connected with the scan line GWL2. The second transistor T2 may be turned on in response to the scan signal GW2 transferred through the scan line GWL2 and may transfer, to the first electrode S1 of the first transistor T1, the first color data signal GD1 transferred from the data line DL1. The first color data signal GD1 transferred from the data line DL1 may correspond to the first color.

The third transistor T3 includes a first electrode connected with the gate electrode G1 of the first transistor T1, a second electrode connected with the second electrode D1 of the first transistor T1, and a gate electrode connected with the scan line GCL2. The third transistor T3 may be turned on in response to the scan signal GC2 transferred through the scan line GCL2 and may diode-connect the first transistor T1 by connecting the gate electrode G1 and the second electrode D1 of the first transistor T1.

The fourth transistor T4 includes a first electrode connected with the gate electrode G1 of the first transistor T1, a second electrode connected with the third driving voltage line VL3 through which the first initialization voltage VINT1 is transferred, and a gate electrode connected with the scan line GIL2. The fourth transistor T4 may be turned on in response to the scan signal GI2 transferred through the scan line GIL2 and may transfer the first initialization voltage VINT1 to the gate electrode G1 of the first transistor T1 to perform an initialization operation of initializing the voltage of the gate electrode G1 of the first transistor T1.

The fifth transistor T5 includes a first electrode S5 connected with the first driving voltage line VL1, a second electrode D5 connected with the first electrode S1 of the first transistor T1, and a gate electrode connected to the emission control line EML2.

The sixth transistor T6 includes a first electrode S6 connected with the second electrode D1 of the first transistor T1, a second electrode D6 connected to an anode of the first light emitting element GE21, and a gate electrode G6 connected to the emission control line EML2. The second electrode D6 of the sixth transistor T6 and the anode of the first light emitting element GE21 may be connected through the contact hole CT21.

The fifth transistor T5 and the sixth transistor T6 may be simultaneously turned on in response to the emission control signal EM2 transferred through the emission control line EML2. As the fifth transistor T5 and the sixth transistor T6 are turned on, a current path may be formed from the first driving voltage line VL1 to the first light emitting element GE21 through the fifth transistor T5, the first transistor T1, and the sixth transistor T6. In this case, a current flowing through the first transistor T1 may correspond to charges charged in the capacitor Cst. Accordingly, a current Ig corresponding to the first color data signal GD1 may be transferred to the first light emitting element GE21. In other words, the first color data signal GD1 may be converted into the current Ig through the 21st pixel circuit PC21 and may be provided to the first light emitting element GE21.

The seventh transistor T7 includes a first electrode connected with the second electrode D6 of the sixth transistor T6, a second electrode connected with the fourth driving voltage line VL4, and a gate electrode connected with the scan line GWL3. The seventh transistor T7 may be turned on in response to the scan signal GW3 transferred through the scan line GWL3 and may initialize the anode of the first light emitting element GE21 to the second initialization voltage VINT2 from the fourth driving voltage line VL4.

The one end of the capacitor Cst is connected with the gate electrode G1 of the first transistor T1 as described herein, and the opposite end of the capacitor Cst is connected with the first driving voltage line VL1. A cathode of the first light emitting element GE21 may be connected with the second driving voltage line VL2 that transfers the second driving voltage ELVSS.

Similarly to the 21st pixel circuit PC21 illustrated in FIG. 3, the 11th, 14th, 15th, 18th, 24th, 25th, and 28th pixel circuits PC11, PC14, PC15, PC18, PC24, PC25, and PC28 illustrated in FIG. 2 may be electrically connected with the first light emitting elements GE11, GE12, GE13, GE14, GE22, GE23, and GE24, respectively.

Figure 4:
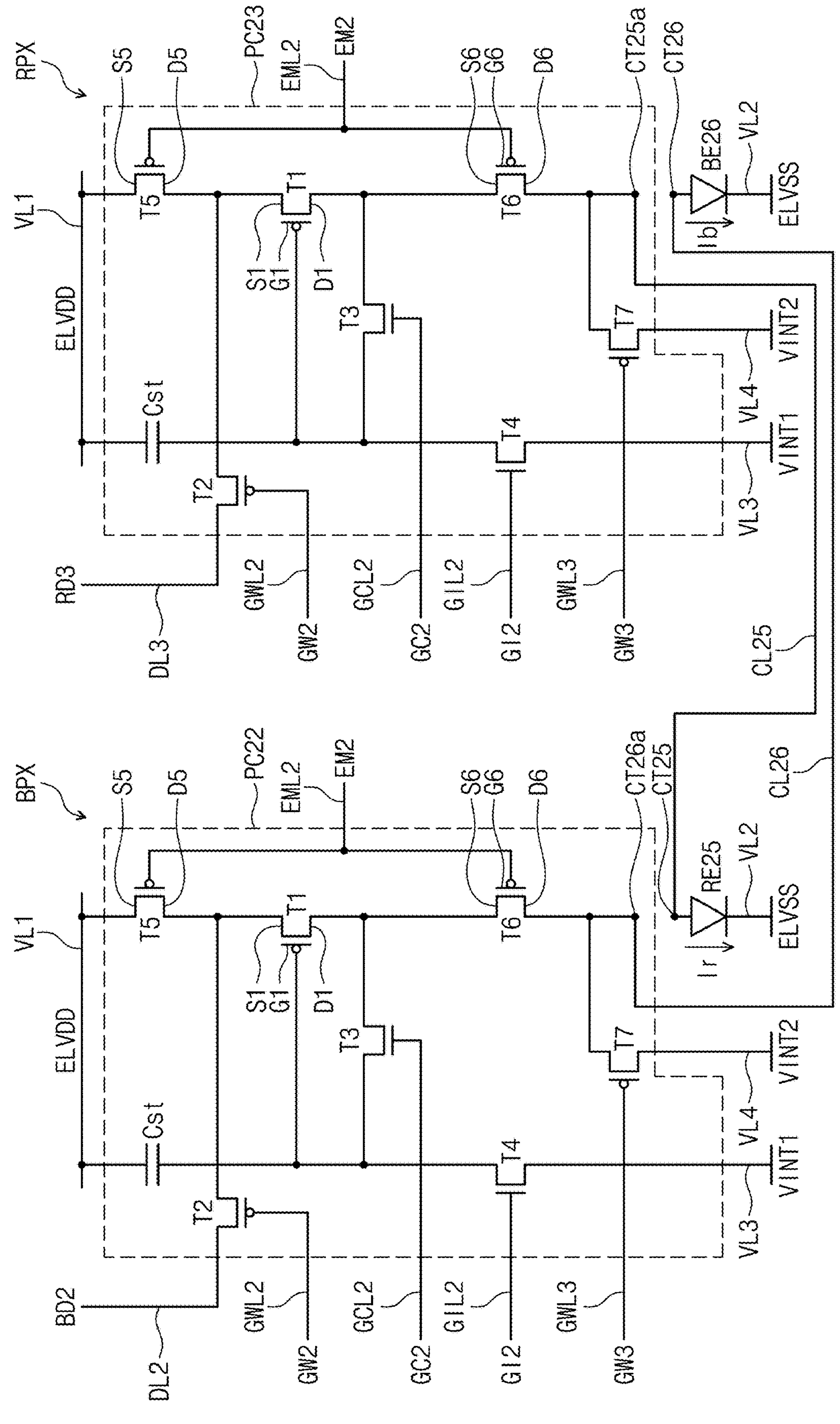
FIG. 4 is a circuit diagram of a second pixel and a third pixel according to an embodiment of the present disclosure.

FIG. 4 is a circuit diagram of a second pixel BPX and a third pixel RPX according to an embodiment of the present disclosure.

Referring to FIG. 4, the second pixel BPX includes the $22^{nd}$ pixel circuit PC22 and the second light emitting element BE26. The third pixel RPX includes the $23^{rd}$ pixel circuit PC23 and the third light emitting element RE25.

Each of the $22^{nd}$ pixel circuit PC22 and the $23^{rd}$ pixel circuit PC23 illustrated in FIG. 4 may include a circuit configuration similar to the circuit configuration of the $21^{st}$ pixel circuit PC21 illustrated in FIG. 3. Components of the $22^{nd}$ pixel circuit PC22 and the $23^{rd}$ pixel circuit PC23 of FIG. 4 that are identical to the components of the $21^{st}$ pixel circuit PC21 illustrated in FIG. 3 will be assigned with the identical reference numerals, and repetitive descriptions will be omitted.

Referring to FIGS. 2 and 4, the $22^{nd}$ pixel circuit PC22 may be electrically connected with the second light emitting element BE26 through a connecting line CL26. Accordingly, a current Ib corresponding to the second color data signal BD2 provided to the $22^{nd}$ pixel circuit PC22 may be transferred to the second light emitting element BE26. In other words, the second color data signal BD2 may be converted into the current Ib through the $22^{nd}$ pixel circuit PC22 and may be provided to the second light emitting element BE26.

The $23^{rd}$ pixel circuit PC23 may be electrically connected with the third light emitting element RE25 through a connecting line CL25. Accordingly, a current Ir corresponding to the third color data signal RD3 provided to the $23^{rd}$ pixel circuit PC23 may be transferred to the third light emitting element RE25. In other words, the third color data signal RD3 may be converted into the current Ir through the $23^{rd}$ pixel circuit PC23 and may be provided to the third light emitting element RE25.

Figure 5:
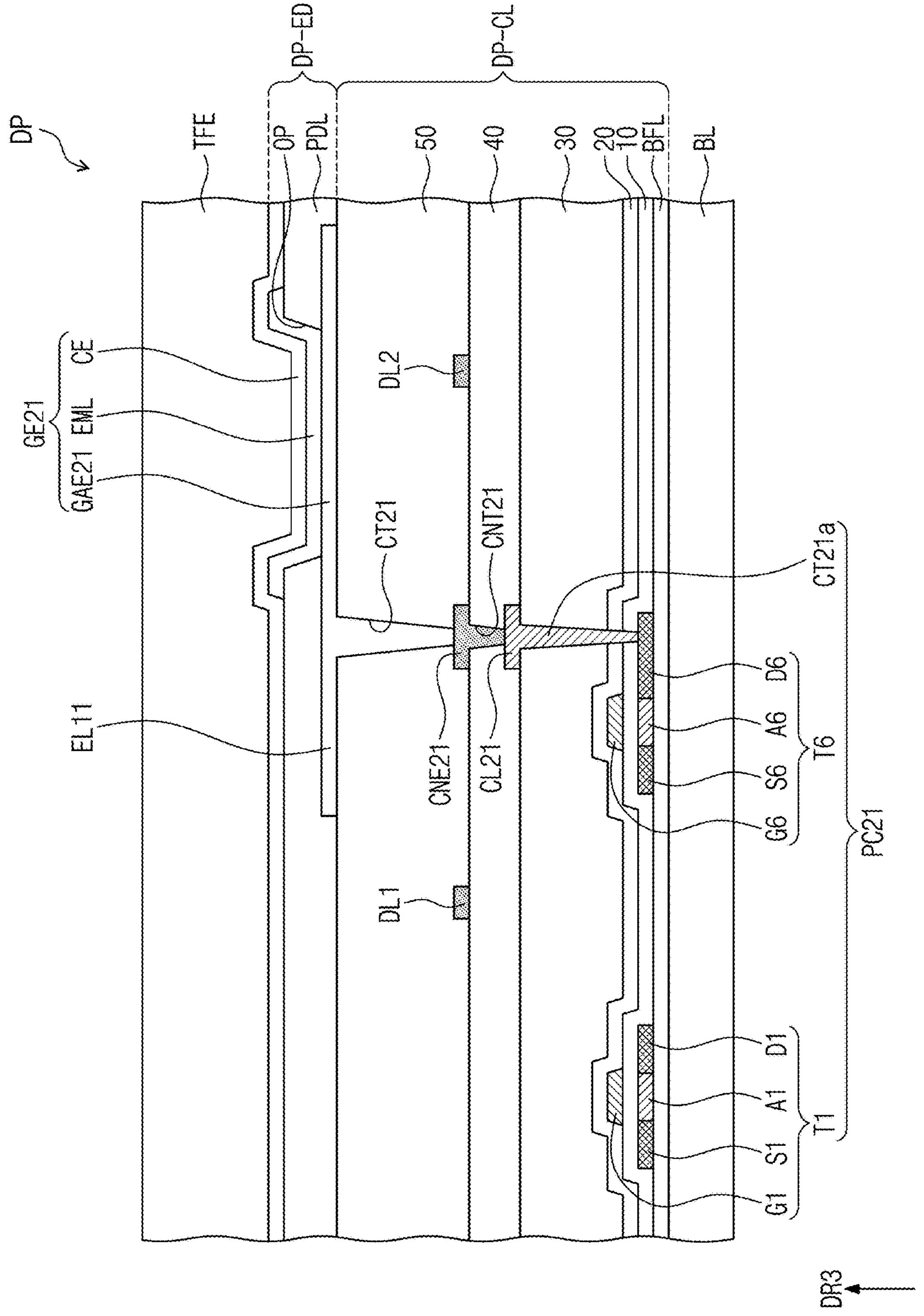
FIG. 5 is a sectional view illustrating a portion of a first light emitting element and a $21^{st}$ pixel circuit of the display panel according to an embodiment of the present disclosure.

FIG. 5 is a sectional view illustrating a portion of the first light emitting element GE21 and the $21^{st}$ pixel circuit PC21 of the display panel DP according to an embodiment of the present disclosure.

Referring to FIG. 5, the display panel DP may include a base layer BL, a circuit element layer DP-CL, a display element layer DP-ED, and a thin film encapsulation layer TFE. The display panel DP may further include functional layers such as, for example, a reflective index control layer. The circuit element layer DP-CL includes at least a plurality of insulating layers and a circuit element. Hereinafter, the insulating layers may include an organic layer and/or an inorganic layer.

An insulating layer, a semiconductor layer, and a conductive layer are formed through a process such as, for example, coating, deposition, or the like. Thereafter, the insulating layer, the semiconductor layer, and the conductive layer may be selectively subjected to patterning through a photolithography process and an etching process. A semiconductor pattern, a conductive pattern, and a signal line are formed through these processes. Patterns disposed on the same layer are formed through the same process.

The base layer BL may include a synthetic resin layer. The synthetic resin layer may include a thermosetting resin. In particular, the synthetic resin layer may be a polyimide-based resin layer, and the material of synthetic resin layer is not particularly limited. The synthetic resin layer may include at least one of an acrylic resin, a methacrylic resin, a polyisoprene resin, a vinyl resin, an epoxy resin, a urethane-based resin, a celluosic resin, a siloxane-based resin, a polyamide resin, or a perylene-based resin. In some aspects, the base layer BL may include a glass substrate, a metal substrate, or an organic/inorganic composite substrate.

At least one inorganic layer is formed on the upper surface of the base layer BL. The inorganic layer may include at least one of aluminum oxide, titanium oxide, silicon oxide, silicon oxy nitride, zirconium oxide, or hafnium oxide. The inorganic layer may be formed of multiple layers. At least one of the multiple inorganic layers may constitute a buffer layer BFL.

The buffer layer BFL improves the coupling force between the base layer BL and a semiconductor pattern and/or a conductive pattern. The buffer layer BFL may include silicon oxide layers and silicon nitride layers. The silicon oxide layers and the silicon nitride layers may be alternately stacked one above another.

The semiconductor pattern is disposed on the buffer layer BFL. The semiconductor pattern may be directly disposed on the buffer layer BFL. The semiconductor pattern may include a silicon semiconductor. The semiconductor pattern may include low-temperature polycrystalline silicon. However, without being limited thereto, the semiconductor pattern may include amorphous silicon.

The semiconductor pattern has different electrical properties depending on whether doping is performed or not. The semiconductor pattern may include a doped area and a non-doped area. The doped area may be doped with an N-type dopant or a P-type dopant. A P-type transistor includes a doped area doped with a P-type dopant.

The doped area has a higher conductivity than the non-doped area and substantially serves as an electrode or a signal line. The non-doped area substantially corresponds to an active area (or, a channel) of a transistor. In other words, one portion of the semiconductor pattern may be the active area of the transistor, another portion of the semiconductor pattern may be a first electrode (or, a source electrode) or a second electrode (or, a drain electrode) of the transistor, and another portion of the semiconductor pattern may be a connecting electrode or a connecting signal line.

As illustrated in FIG. 5, the first electrode S1, an active area A1, and the second electrode D1 of the first transistor T1 in the $21^{st}$ pixel circuit PC21 are formed from the semiconductor pattern. The first electrode S1 and the second electrode D1 of the first transistor T1 extend from the active area A1 in opposite directions. In some aspects, the first electrode S6, an active area A6, and the second electrode D6 of the sixth transistor T6 are formed from the semiconductor pattern. The first electrode S6 and the second electrode D6 of the sixth transistor T6 extend from the active area A6 in opposite directions. Although not separately illustrated, the first electrode S6 of the sixth transistor T6 may be connected to the second electrode D1 of the first transistor T1.

As illustrated in FIG. 3, the first electrode S6 of the sixth transistor T6 may be electrically connected with the second electrode D1 of the first transistor T1.

A first insulating layer 10 is disposed on the buffer layer BFL. The first insulating layer 10 commonly overlaps the $11^{th}$ to $18^{th}$ pixel circuits PC11 to PC18 and the $21^{st}$ to $28^{th}$ pixel circuits PC21 to PC28 illustrated in FIG. 2 and covers the semiconductor pattern. The first insulating layer 10 may include an inorganic layer and/or an organic layer and may have a single-layer structure or a multi-layer structure. The first insulating layer 10 may include at least one of aluminum oxide, titanium oxide, silicon oxide, silicon oxy nitride, zirconium oxide, or hafnium oxide. In this embodiment, the first insulating layer 10 may be a single silicon oxide layer. Not only the first insulating layer 10 but also insulating layers of the circuit element layer DP-CL that will be described herein may include inorganic layers and/or organic layers and may have a single layer structure or a multi-layer structure. The inorganic layers may include at least one of the aforementioned materials.

The gate electrode G1 of the first transistor T1 is disposed on the first insulating layer 10. The gate electrode G1 may be a portion of a metal pattern. The gate electrode G1 of the first transistor T1 overlaps the active area A1 of the first transistor T1. The gate electrode G1 of the first transistor T1 serves as a mask in a process of doping the semiconductor pattern.

A second insulating layer 20 is disposed on the first insulating layer 10 and covers the gate electrode G1. The second insulating layer 20 may commonly overlap the $11^{th}$ to $18^{th}$ pixel circuits PC11 to PC18 and the $21^{st}$ to $28^{th}$ pixel circuits PC21 to PC28. The second insulating layer 20 may include an inorganic layer and/or an organic layer and may have a single-layer structure or a multi-layer structure. In this embodiment, the second insulating layer 20 may be a single silicon oxide layer.

A third insulating layer 30 is disposed on the second insulating layer 20. In this embodiment, the third insulating layer 30 may be a single silicon oxide layer.

A connecting line CL21 may be disposed on the third insulating layer 30. The connecting line CL21 may be connected to the second electrode D6 of the sixth transistor T6 through a contact hole CT21*a* penetrating the first to third insulating layers 10 to 30.

A fourth insulating layer 40 may be disposed on the third insulating layer 30 and cover the connecting line CL21. The fourth insulating layer 40 may be a single silicon oxide layer. A connecting electrode CNE21 may be disposed on the fourth insulating layer 40. The connecting electrode CNE21 may be connected to the connecting line CL21 through a contact hole CNT21 penetrating the fourth insulating layer 40.

In an embodiment, likewise to the connecting electrode CNE21, the data lines DL1 and DL2 may be disposed on the fourth insulating layer 40.

A fifth insulating layer 50 is disposed on the fourth insulating layer 40 and covers the connecting electrode CNE21. The fifth insulating layer 50 may be an organic layer.

The anode GAE21 is disposed on the fifth insulating layer 50. The anode GAE21 is connected to the connecting electrode CNE21 through the contact hole CT21 penetrating the fifth insulating layer 50. Accordingly, the anode GAE21 may be connected to the second electrode D6 of the sixth transistor T6 through the connecting electrode CNE21 and the connecting line CL21.

An opening OP is defined in a pixel defining layer PDL. The opening OP of the pixel defining layer PDL exposes at least a portion of the anode GAE21.

An emissive layer EML is disposed on the anode GAE21. The emissive layer EML may be disposed only in an area corresponding to the opening OP. The emissive layer EML may be separately formed for each of the $11^{th}$ to $18^{th}$ pixel circuits PC11 to PC18 and the $21^{st}$ to $28^{th}$ pixel circuits PC21 to PC28.

Although the patterned emissive layer EML is illustrated in this embodiment, the emissive layer EML may be commonly disposed in the $11^{th}$ to $18^{th}$ pixel circuits PC11 to PC18 and the $21^{st}$ to $28^{th}$ pixel circuits PC21 to PC28. In this case, the emissive layer EML may generate white light or blue light. In some aspects, the emissive layer EML may have a multi-layer structure. The cathode CE is disposed on the emissive layer EML. The cathode CE is commonly disposed in the $11^{th}$ to $18^{th}$ pixel circuits PC11 to PC18 and the $21^{st}$ to $28^{th}$ pixel circuits PC21 to PC28.

Although not illustrated in the drawing, a hole control layer may be disposed between the anode GAE21 and the emissive layer EML. In some aspects, an electron control layer may be disposed between the emissive layer EML and the cathode CE.

The thin film encapsulation layer TFE is disposed on the cathode CE. The thin film encapsulation layer TFE is commonly disposed in the $11^{th}$ to $18^{th}$ pixel circuits PC11 to PC18 and the $21^{st}$ to $28^{th}$ pixel circuits PC21 to PC28. In this embodiment, the thin film encapsulation layer TFE directly covers the cathode CE. In an embodiment of the present disclosure, a capping layer that directly covers the cathode CE may be additionally disposed.

The thin film encapsulation layer TFE includes at least an inorganic layer or an organic layer. In an embodiment of the present disclosure, the thin film encapsulation layer TFE may include two inorganic layers and an organic layer disposed between the two inorganic layers. In an embodiment of the present disclosure, the thin film encapsulation layer TFE may include a plurality of inorganic layers and a plurality of organic layers alternately stacked one above another.

The inorganic layers protect the first light emitting element GE21 from moisture/oxygen, and the organic layers protect the first light emitting element GE21 from foreign matter such as, for example, dust particles. The inorganic layers may include a silicon nitride layer, a silicon oxy nitride layer, a silicon oxide layer, a titanium oxide layer, or an aluminum oxide layer, but are not particularly limited thereto. The organic layers may include an acrylic organic layer, but are not particularly limited.

Figure 6:
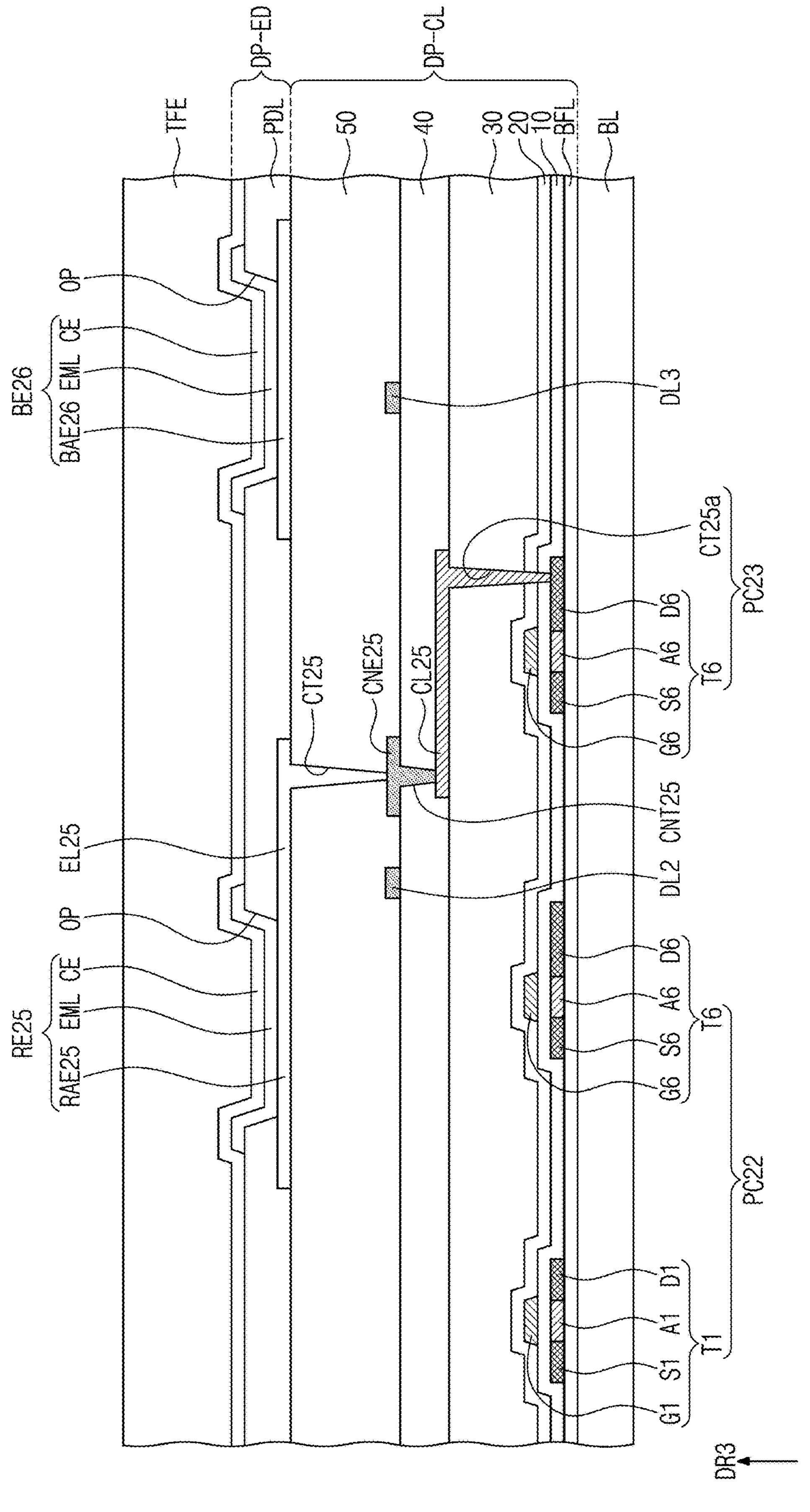
FIG. 6 is a sectional view illustrating a portion of a third light emitting element, a $2^{2nd}$ pixel circuit, and a $23^{rd}$ pixel circuit of the display panel according to an embodiment of the present disclosure.

FIG. 6 is a sectional view illustrating a portion of the third light emitting element RE25, the $22^{nd}$ pixel circuit PC22, and the $23^{rd}$ pixel circuit PC23 of the display panel DP according to an embodiment of the present disclosure.

The third light emitting element RE25 illustrated in FIG. 6 may include components similar to the components of the first light emitting element GE21 illustrated in FIG. 5. Therefore, repetitive descriptions will be omitted.

A first transistor T1 and a sixth transistor T6 of the $22^{nd}$ pixel circuit PC22 illustrated in FIG. 6 may include components similar to the components of the first transistor T1 and the sixth transistor T6 of the $21^{st}$ pixel circuit PC21 illustrated in FIG. 5. Therefore, repetitive descriptions will be omitted.

Furthermore, a sixth transistor T6 of the $23^{rd}$ pixel circuit PC23 illustrated in FIG. 6 may include components similar to the components of the sixth transistor T6 of the $21^{st}$ pixel circuit PC21 illustrated in FIG. 5. Therefore, repetitive descriptions will be omitted.

Referring to FIG. 6, at least a portion of the third light emitting element RE25 may be formed to overlap the $22^{nd}$ pixel circuit PC22. An anode RAE25 of the third light emitting element RE25 may be electrically connected with the connecting line CL25 through the contact hole CT25 and a contact hole CNT25 of a connecting electrode CNE25. The connecting line CL25 extends from the contact hole CNT25 of the connecting electrode CNE25 in the direction in which the $23^{rd}$ pixel circuit PC23 is disposed.

The connecting line CL25 may be connected to the second electrode D6 of the sixth transistor T6 in the $23^{rd}$ pixel circuit PC23 through a contact hole CT25*a* penetrating the first to third insulating layers 10 to 30.

That is, the anode RAE25 of the third light emitting element RE25 may be electrically connected with the second electrode D6 of the sixth transistor T6 in the $23^{rd}$ pixel circuit PC23 through the contact hole CT25, the connecting electrode CNE25, and the connecting line CL25.

Figure 7:
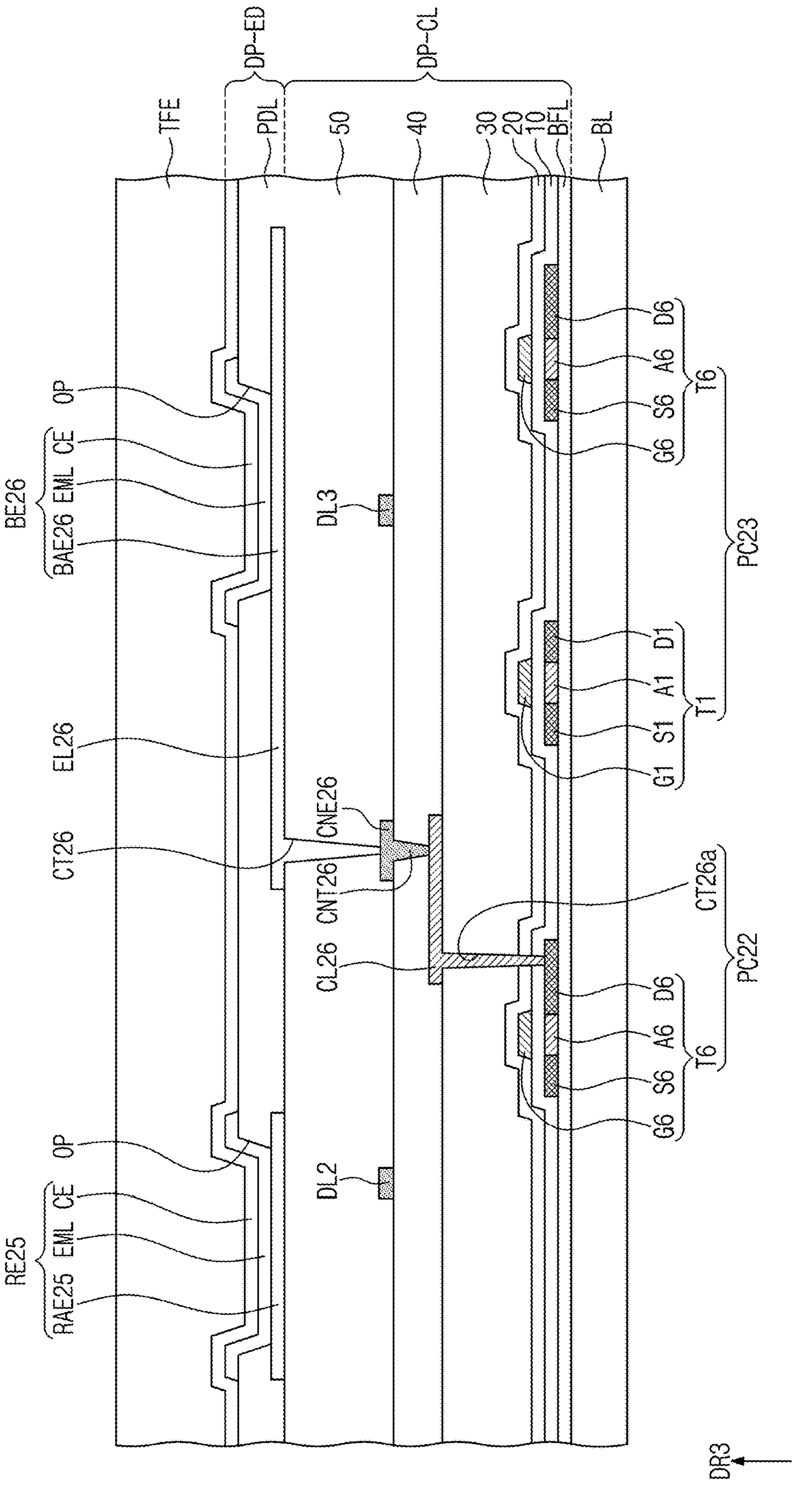
FIG. 7 is a sectional view illustrating a portion of a second light emitting element, the $22^{nd}$ pixel circuit, and the $23^{rd}$ pixel circuit of the display panel according to an embodiment of the present disclosure.

FIG. 7 is a sectional view illustrating a portion of the second light emitting element BE26, the 22$^{nd}$ pixel circuit PC22, and the 23$^{rd}$ pixel circuit PC23 of the display panel DP according to an embodiment of the present disclosure.

The second light emitting element BE26 illustrated in FIG. 7 may include components similar to the components of the first light emitting element GE21 illustrated in FIG. 5. Therefore, repetitive descriptions will be omitted.

The first transistor T1 and the sixth transistor T6 of the 22$^{nd}$ pixel circuit PC22 illustrated in FIG. 7 may include components similar to the components of the first transistor T1 and the sixth transistor T6 of the 21$^{st}$ pixel circuit PC21 illustrated in FIG. 5. Therefore, repetitive descriptions will be omitted.

Furthermore, the sixth transistor T6 of the 23$^{rd}$ pixel circuit PC23 illustrated in FIG. 7 may include components similar to the components of the sixth transistor T6 of the 21$^{st}$ pixel circuit PC21 illustrated in FIG. 5. Therefore, repetitive descriptions will be omitted.

Referring to FIG. 7, at least a portion of the second light emitting element BE26 may be formed to overlap the 23$^{rd}$ pixel circuit PC23. An anode BAE26 of the second light emitting element BE26 may be electrically connected with the connecting line CL26 through the contact hole CT26 and a contact hole CNT26 of a connecting electrode CNE26. The connecting line CL26 extends from the contact hole CNT26 of the connecting electrode CNE26 in the direction in which the 22$^{nd}$ pixel circuit PC22 is disposed. The connecting line CL26 may be connected to the second electrode D6 of the sixth transistor T6 in the 22$^{nd}$ pixel circuit PC23 through a contact hole CT26*a* penetrating the first to third insulating layers 10 to 30.

That is, the anode BAE26 of the second light emitting element BE26 may be electrically connected with the second electrode D6 of the sixth transistor T6 in the 22$^{nd}$ pixel circuit PC22 through the contact hole CT26, the connecting electrode CNE26, and the connecting line CL26.

Figure 8:
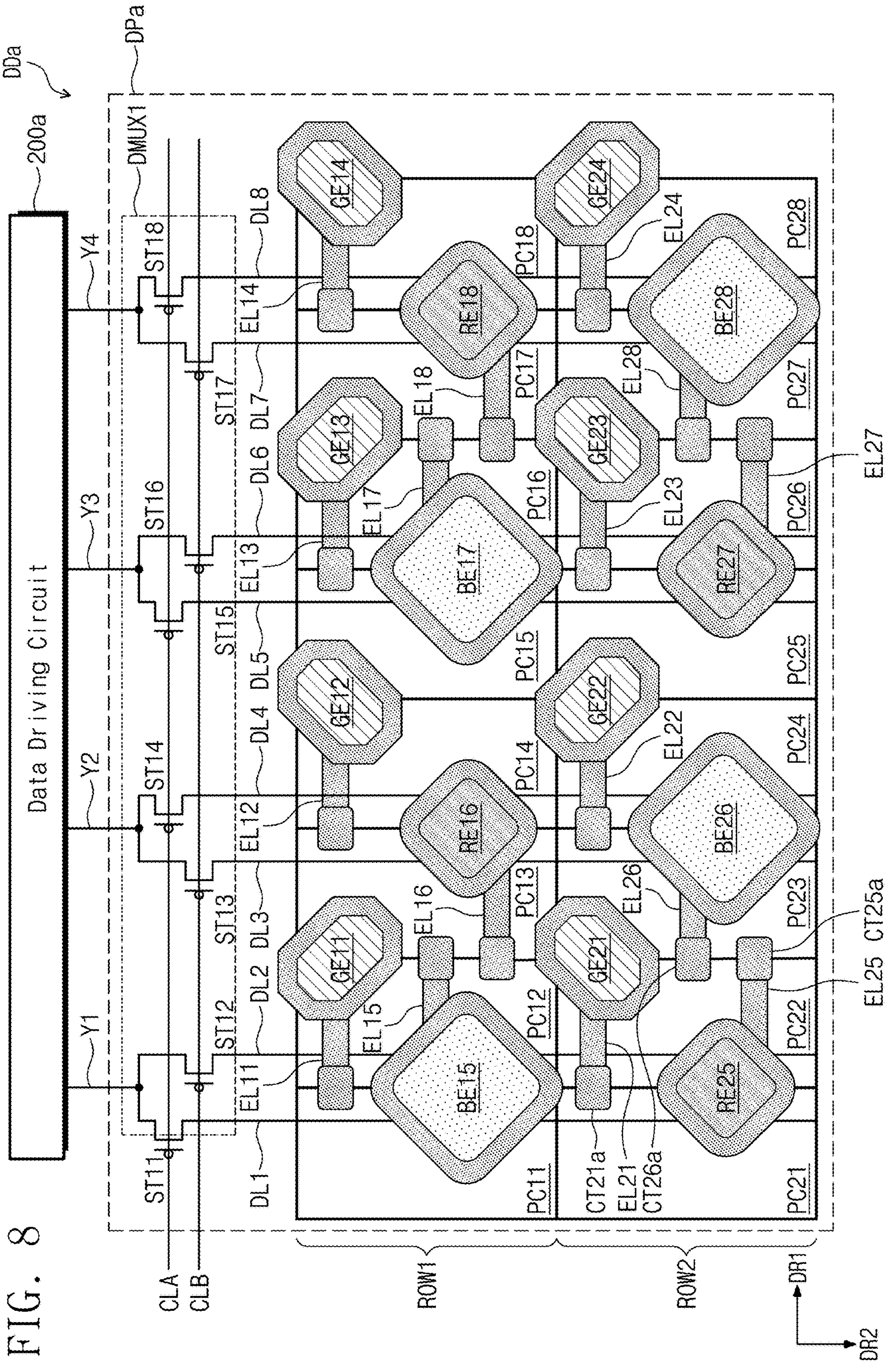
FIG. 8 is a view illustrating a data driving circuit and a display panel of a display device according to an embodiment of the present disclosure.

FIG. 8 is a view illustrating a data driving circuit 200*a* and a display panel DPa of a display device DDa according to an embodiment of the present disclosure.

Referring to FIG. 8, the data driving circuit 200*a* converts an output image signal DS provided from the driving controller 100 (refer to FIG. 1) into first to third color data signals and outputs the first to third color data signals to output lines Y1 to Y4. Each of the first to third color data signals may have a voltage level corresponding to the grayscale level of the output image signal DS. In an embodiment, the number of output lines Y1 to Y4 may be smaller than the number of data lines DL1 to DL8.

The display panel DPa includes a demultiplexer DMUX1. The demultiplexer DMUX1 may electrically connect the output lines Y1 to Y4 and the data lines DL1 to DL8 in response to first and second switching signals CLA and CLB. In an embodiment, the first and second switching signals CLA and CLB may be provided from the driving controller 100 illustrated in FIG. 1.

In FIG. 8, the demultiplexer DMUX1 is illustrated as being disposed in the display panel DPa. However, embodiments of the present disclosure are not limited thereto. In an embodiment, the demultiplexer DMUX1 may be included in the data driving circuit 200*a*. In an embodiment, the demultiplexer DMUX1 may be included in a separate driving circuit or a separate circuit board that is independent of the display panel DPa and the data driving circuit 200*a*.

The demultiplexer DMUX1 includes switching transistors ST11, ST12, ST13, ST14, ST15, ST16, ST17, and ST18.

The switching transistor ST11 is connected between the output line Y1 and the data line DL1. The switching transistor ST12 is connected between the output line Y1 and the data line DL2. The switching transistor ST13 is connected between the output line Y2 and the data line DL3. The switching transistor ST14 is connected between the output line Y2 and the data line DL4. The switching transistor ST15 is connected between the output line Y3 and the data line DL5. The switching transistor ST16 is connected between the output line Y3 and the data line DL6. The switching transistor ST17 is connected between the output line Y4 and the data line DL7. The switching transistor ST18 is connected between the output line Y4 and the data line DL8.

The switching transistors ST11, ST14, ST15, and ST18 are turned on in response to the first switching signal CLA, and the switching transistors ST12, ST13, ST16, and ST17 are turned on in response to the second switching signal CLB. For example, the switching transistors ST11, ST14, ST15, and ST18 may be turned on when the first switching signal CLA is equal to or less than a threshold voltage level (i.e., a low level or low voltage level) (also referred to herein as an activation level), and the switching transistors ST12, ST13, ST16, and ST17 may be turned on when the second switching signal CLB is less than or equal to a threshold voltage level (i.e., a low level or low voltage level) (also referred to herein as an activation level).

Figure 9:
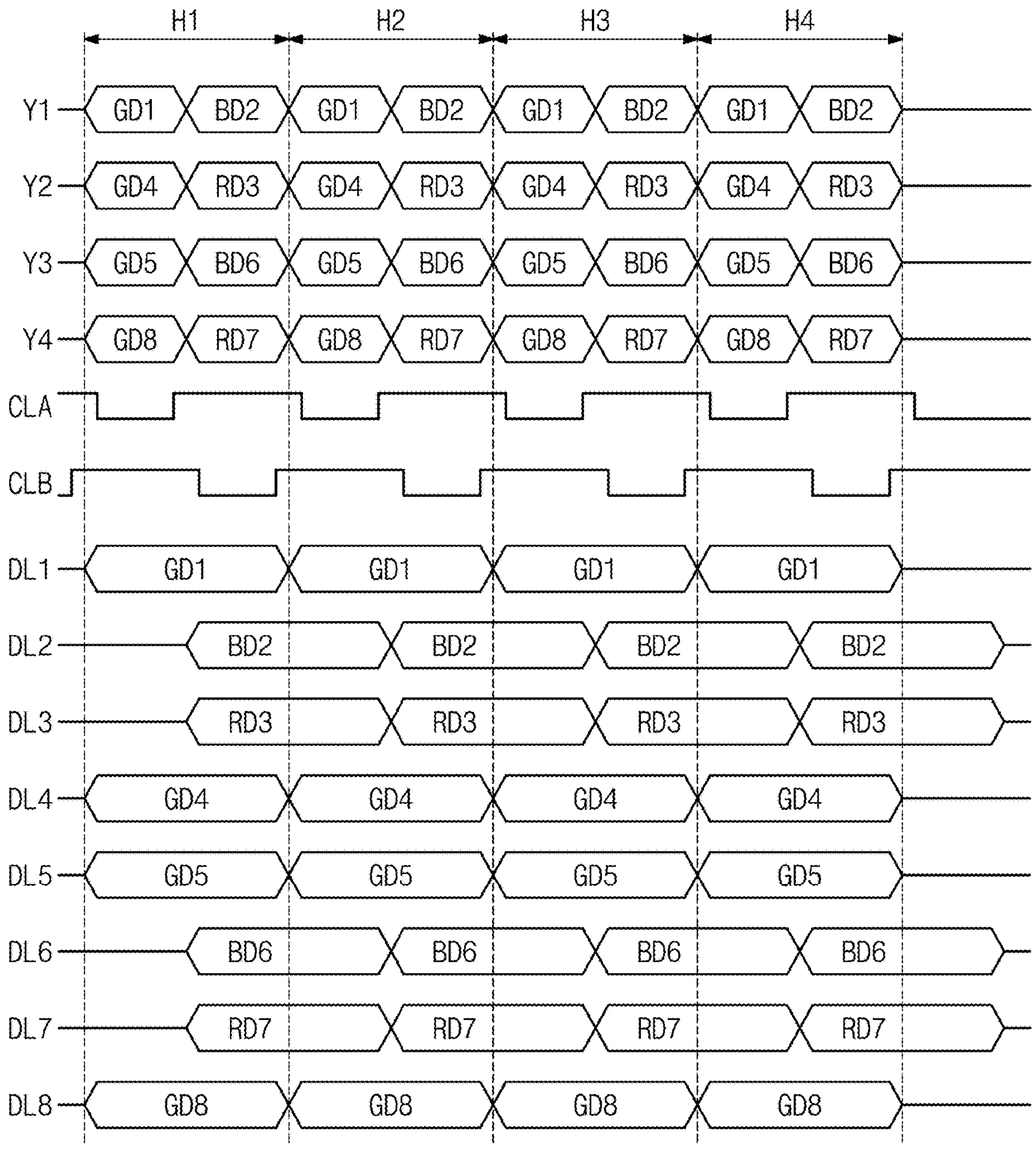
FIG. 9 is a timing diagram for explaining an operation of the display device according to an embodiment of the present disclosure.

FIG. 9 is a timing diagram for explaining an operation of the display device DDa according to an embodiment of the present disclosure.

Referring to FIGS. 1, 8, and 9, the data driving circuit 200*a* alternately and sequentially outputs a first color data signal GD1 and a second color data signal BD2 to the demultiplexer DMUX1 through the output line Y1.

The data driving circuit 200*a* alternately and sequentially outputs a first color data signal GD4 and a third color data signal RD3 to the demultiplexer DMUX1 through the output line Y2.

The data driving circuit 200*a* alternately and sequentially outputs a first color data signal GD5 and a second color data signal BD6 to the demultiplexer DMUX1 through the output line Y3.

The data driving circuit 200*a* alternately and sequentially outputs a first color data signal GD8 and a third color data signal RD7 to the demultiplexer DMUX1 through the output line Y4.

The first and second switching signals CLA and CLB are sequentially set to low levels (expressed another way, activated at low levels) in each of horizontal periods H1, H2, H3, and H4. For example, during the horizontal period H1, the first switching signal CLA is activated at a low level, and thereafter the second switching signal CLB is activated at a low level. In an embodiment, the low level section of the first switching signal CLA does not overlap the low level section of the second switching signal CLB.

When the first switching signal CLA is at the low level, the demultiplexer DMUX1 outputs the first color data signals GD1, GD4, GD5, and GD8 from the output lines Y1, Y2, Y3, and Y4 to the data lines DL1, DL4, DL5, and DL8.

When the second switching signal CLB is at the low level, the demultiplexer DMUX1 outputs the second color data signals BD2 and BD6 and the third color data signals RD3 and RD7 from the output lines Y1, Y2, Y3, and Y4 to the data lines DL2, DL3, DL6, and DL7.

Accordingly, the first color data signal GD1, the second color data signal BD2, the third color data signal RD3, the first color data signal GD4, the first color data signal GD5, the second color data signal BD6, the third color data signal RD7, and the first color data signal GD8 may be provided to the data lines DL1, DL2, DL3, DL4, DL5, DL6, DL7, and DL8, respectively.

In the example illustrated in FIG. 8, some of the data lines DL1 to DL8 may be arranged adjacent two by two. That is, the data lines DL1 and DL2 are arranged adjacent to each other, the data lines DL3 and DL4 are arranged adjacent to each other, the data lines DL5 and DL6 are arranged adjacent to each other, and the data lines DL7 and DL8 are arranged adjacent to each other.

In an example in which the third color data signal RD3 is transferred to the data line DL3 while the data line DL2 of the two adjacent data lines DL2 and DL3 is floating, the third color data signal RD3 may affect the data line DL2 due to coupling between the data lines DL2 and DL3.

In the example illustrated in FIG. 8, the demultiplexer DMUX1 simultaneously outputs the first color data signals GD1, GD4, GD5, and GD8 in response to the first switching signal CLA. The demultiplexer DMUX1 simultaneously outputs the second color data signals BD2 and BD6 and the third color data signals RD3 and RD7 in response to the second switching signal CLB.

That is, the second color data signal BD2 and the third color data signal RD3 are simultaneously transferred to the two adjacent data lines DL2 and DL3. The first color data signals GD4 and GD5 are simultaneously transferred to the two adjacent data lines DL4 and DL5. That is, the second color data signal BD6 and the third color data signal RD7 are simultaneously transferred to the two adjacent data lines DL6 and DL7. Accordingly, the color data signals may be prevented from being distorted due to the coupling between the adjacent data lines.

Figure 10:
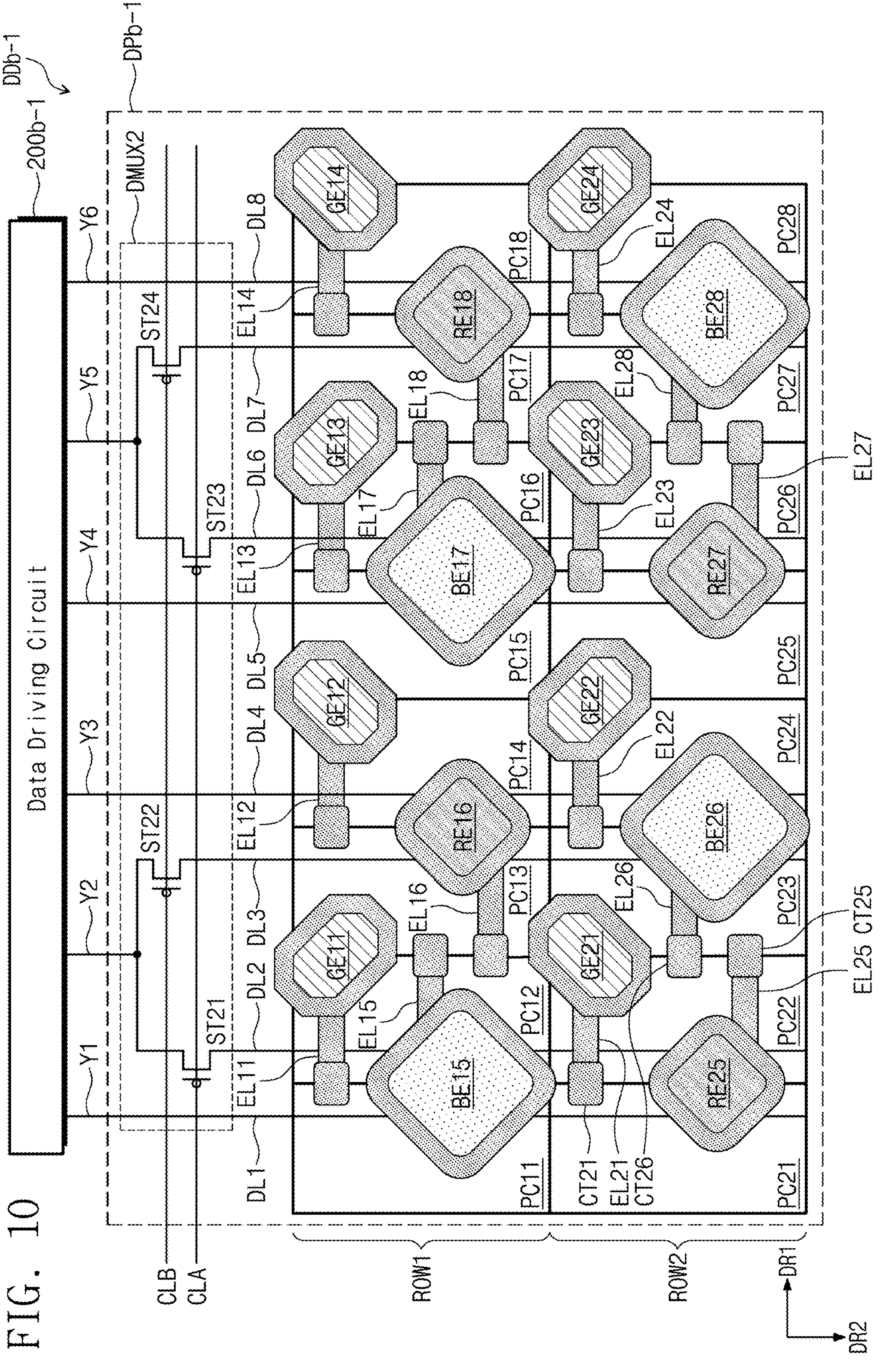
FIG. 10 is a view illustrating a data driving circuit and a display panel of a display device according to an embodiment of the present disclosure.

FIG. 10 is a view illustrating a data driving circuit 200*b*-1 and a display panel DPb-1 of a display device DDb-1 according to an embodiment of the present disclosure.

Referring to FIG. 10, the data driving circuit 200*b*-1 converts an output image signal DS provided from the driving controller 100 (refer to FIG. 1) into first to third color data signals and outputs the first to third color data signals to output lines Y1 to Y6. Each of the first to third color data signals may have a voltage level corresponding to the grayscale level of the output image signal DS. In an embodiment, the number of output lines Y1 to Y6 may be smaller than the number of data lines DL1 to DL8.

Some of the data lines DL1 to DL8 of the display panel DPb-1 may be arranged adjacent two by two. That is, the data lines DL1 and DL2 are arranged adjacent to each other, the data lines DL3 and DL4 are arranged adjacent to each other, the data lines DL5 and DL6 are arranged adjacent to each other, and the data lines DL7 and DL8 are arranged adjacent to each other.

In the example illustrated in FIG. 10, some of the data lines DL1 to DL8 may be arranged adjacent two by two. That is, the data lines DL1 and DL2 are arranged adjacent to each other, the data lines DL3 and DL4 are arranged adjacent to each other, the data lines DL5 and DL6 are arranged adjacent to each other, and the data lines DL7 and DL8 are arranged adjacent to each other.

The display panel DPb-1 includes a demultiplexer DMUX2. The demultiplexer DMUX2 may electrically connect the output lines Y1 to Y6 and the data lines DL1 to DL8 in response to first and second switching signals CLA and CLB. In an embodiment, the first and second switching signals CLA and CLB may be provided from the driving controller 100 illustrated in FIG. 1.

In FIG. 10, the demultiplexer DMUX2 is illustrated as being disposed in the display panel DPb-1. However, embodiments of the present disclosure are not limited thereto. In an embodiment, the demultiplexer DMUX2 may be included in the data driving circuit 200*b*-1. In an embodiment, the demultiplexer DMUX2 may be included in a separate driving circuit or a separate circuit board that is independent of the display panel DPb-1 and the data driving circuit 200*b*-1.

The demultiplexer DMUX2 includes switching transistors ST21, ST22, ST23, and ST24.

In an embodiment, the output lines Y1, Y3, Y4, and Y6 may be directly connected with the data lines DL1, DL4, DL5, and DL8, respectively.

The switching transistor ST21 is connected between the output line Y2 and the data line DL2. The switching transistor ST22 is connected between the output line Y2 and the data line DL3. The switching transistor ST23 is connected between the output line Y5 and the data line DL6. The switching transistor ST24 is connected between the output line Y5 and the data line DL7.

The switching transistors ST21 and ST23 are turned on in response to the first switching signal CLA, and the switching transistors ST22 and ST24 are turned on in response to the second switching signal CLB.

Figure 11:
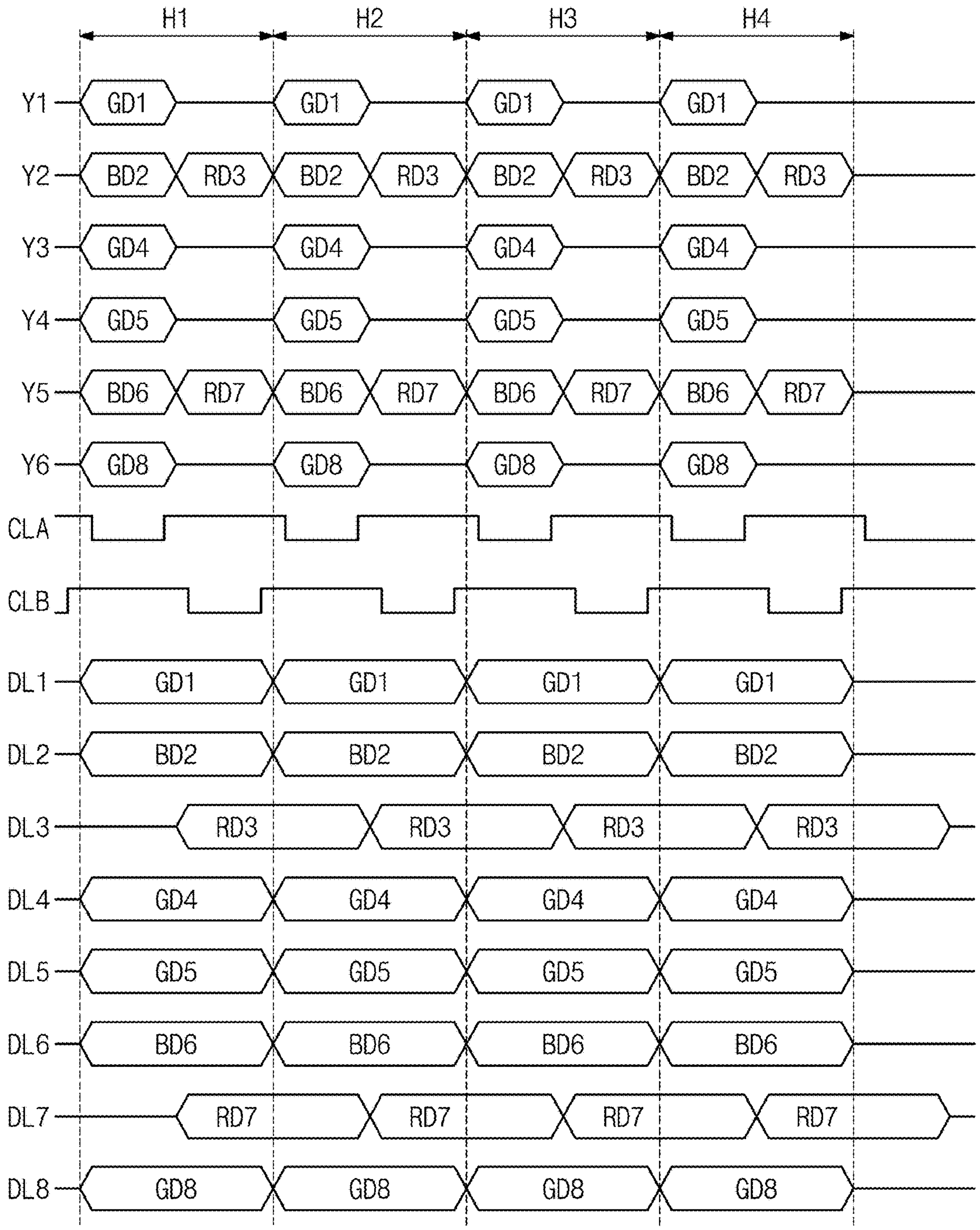
FIG. 11 is a timing diagram for explaining an operation of the display device according to an embodiment of the present disclosure.

FIG. 11 is a timing diagram for explaining an operation of the display device DDb-1 according to an embodiment of the present disclosure.

Referring to FIGS. 1, 10, and 11, the data driving circuit 200*b*-1 sequentially outputs first color data signal GD1 to the demultiplexer DMUX2 through the output line Y1.

The data driving circuit 200*b*-1 alternately and sequentially outputs a second color data signal BD2 and a third color data signal RD3 to the demultiplexer DMUX2 through the output line Y2.

The data driving circuit 200*b*-1 sequentially outputs first color data signals GD4 to the demultiplexer DMUX2 through the output line Y3.

The data driving circuit 200*b*-1 sequentially outputs first color data signals GD5 to the demultiplexer DMUX2 through the output line Y4.

The data driving circuit 200*b*-1 alternately and sequentially outputs a second color data signal BD6 and a third color data signal RD7 to the demultiplexer DMUX2 through the output line Y5.

The data driving circuit 200*b*-1 sequentially outputs first color data signals GD8 to the demultiplexer DMUX2 through the output line Y6.

The first and second switching signals CLA and CLB are sequentially set to low levels (expressed another way, activated at low levels) in each of horizontal periods H1, H2, H3, and H4. For example, during the horizontal period H1, the first switching signal CLA is activated at a low level, and thereafter the second switching signal CLB is activated at a low level. In an embodiment, the low level section of the first switching signal CLA does not overlap the low level section of the second switching signal CLB.

When the first switching signal CLA is at the low level, the demultiplexer DMUX2 outputs the second color data signals BD2 and BD6 from the output lines Y2 and Y5 to the data lines DL2 and DL6.

When the second switching signal CLB is at the low level, the demultiplexer DMUX2 outputs the third color data signals RD3 and RD7 from the output lines Y2 and Y5 to the data lines DL3 and DL7.

Accordingly, the first color data signal GD1, the second color data signal BD2, the third color data signal RD3, the first color data signal GD4, the first color data signal GD5, the second color data signal BD6, the third color data signal RD7, and the first color data signal GD8 may be provided to the data lines DL1, DL2, DL3, DL4, DL5, DL6, DL7, and DL8, respectively.

The data driving circuit 200*b*-1 may output the first color data signals GD1, GD4, GD5, and GD8 to the output lines Y1, Y3, Y4, and Y6 in each of the horizontal periods H1, H2, H3, and H4. Accordingly, unnecessary charging and discharging operations in the output lines Y1, Y3, Y4, and Y6 are reduced. Thus, power consumption of the data driving circuit 200*b*-1 may be minimized.

According to the above-described connection method of the 11$^{th}$ to 18$^{th}$ pixel circuits PC11 to PC18, the 21$^{st}$ to 28$^{th}$ pixel circuits PC21 to PC28, the first light emitting elements GE11 to GE14 and GE21 to GE24, the second light emitting elements BE15, BE17, BE26, and BE28, and the third light emitting elements RE16, RE18, RE25, and RE27, the data driving circuit 200 may be directly connected with the 11$^{th}$ to 18$^{th}$ pixel circuits PC11 to PC18 and the 21$^{st}$ to 28$^{th}$ pixel circuits PC21 to PC28 as illustrated in FIG. 2. Furthermore, as illustrated in FIG. 8, the data driving circuit 200*a* may be connected with the 11$^{th}$ to 18$^{th}$ pixel circuits PC11 to PC18 and the 21$^{st}$ to 28$^{th}$ pixel circuits PC21 to PC28 through the demultiplexer DMUX1. In some aspects, as illustrated in FIG. 10, the data driving circuit 200*b*-1 may be connected with the 11$^{th}$ to 18$^{th}$ pixel circuits PC11 to PC18 and the 21$^{st}$ to 28$^{th}$ pixel circuits PC21 to PC28 through the demultiplexer DMUX2.

Figure 12:
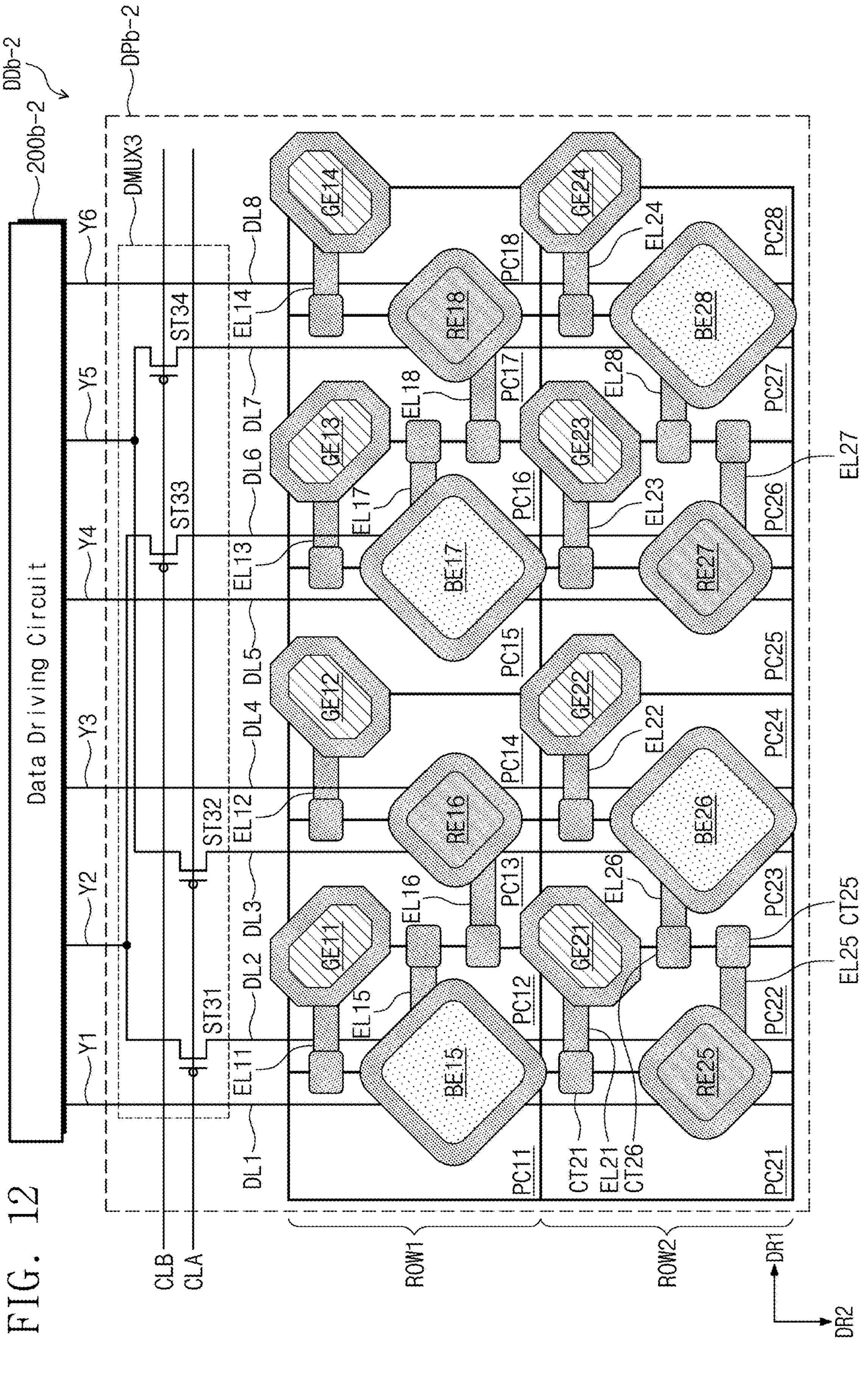
FIG. 12 is a view illustrating a data driving circuit and a display panel of a display device according to an embodiment of the present disclosure.

FIG. 12 is a view illustrating a data driving circuit 200*b*-2 and a display panel DPb-2 of a display device DDb-2 according to an embodiment of the present disclosure.

Referring to FIG. 12, the data driving circuit 200*b*-2 converts an output image signal DS provided from the driving controller 100 (refer to FIG. 1) into first to third color data signals and outputs the first to third color data signals to output lines Y1 to Y6. Each of the first to third color data signals may have a voltage level corresponding to the grayscale level of the output image signal DS. In an embodiment, the number of output lines Y1 to Y6 may be smaller than the number of data lines DL1 to DL8.

Some of the data lines DL1 to DL8 of the display panel DPb-2 may be arranged adjacent two by two. That is, the data lines DL1 and DL2 are arranged adjacent to each other, the data lines DL3 and DL4 are arranged adjacent to each other, the data lines DL5 and DL6 are arranged adjacent to each other, and the data lines DL7 and DL8 are arranged adjacent to each other.

The display panel DPb-2 includes a demultiplexer DMUX3. The demultiplexer DMUX3 may electrically connect the output lines Y1 to Y6 and the data lines DL1 to DL8 in response to first and second switching signals CLA and CLB. In an embodiment, the first and second switching signals CLA and CLB may be provided from the driving controller 100 illustrated in FIG. 1.

In FIG. 12, the demultiplexer DMUX3 is illustrated as being disposed in the display panel DPb-2. However, embodiments of the present disclosure are not limited thereto. In an embodiment, the demultiplexer DMUX3 may be included in the data driving circuit 200*b*-2. In an embodiment, the demultiplexer DMUX3 may be included in a separate driving circuit or a separate circuit board that is independent of the display panel DPb-2 and the data driving circuit 200*b*-2.

The demultiplexer DMUX3 includes switching transistors ST31, ST32, ST33, and ST34.

In an embodiment, the output lines Y1, Y3, Y4, and Y6 may be directly connected with the data lines DL1, DL4, DL5, and DL8, respectively.

The switching transistor ST31 is connected between the output line Y2 and the data line DL2. The switching transistor ST32 is connected between the output line Y5 and the data line DL3. The switching transistor ST33 is connected between the output line Y2 and the data line DL6. The switching transistor ST34 is connected between the output line Y5 and the data line DL7.

The switching transistors ST31 and ST32 are turned on in response to the first switching signal CLA, and the switching transistors ST33 and ST34 are turned on in response to the second switching signal CLB.

Figure 13:
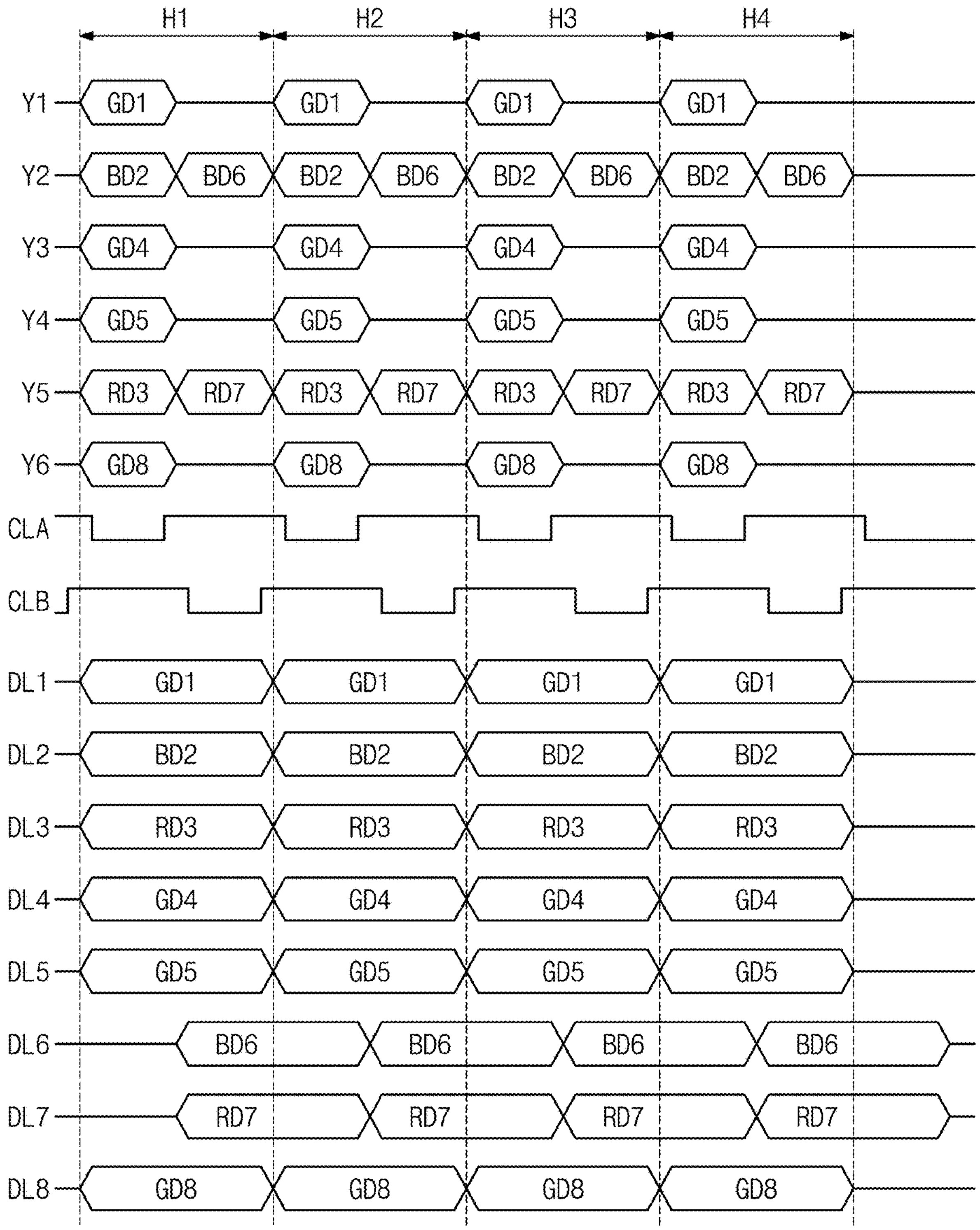
FIG. 13 is a timing diagram for explaining an operation of the display device according to an embodiment of the present disclosure.

FIG. 13 is a timing diagram for explaining an operation of the display device DDb-2 according to an embodiment of the present disclosure.

Referring to FIGS. 1, 12, and 13, the data driving circuit 200*b*-2 sequentially outputs first color data signals GD1 to the demultiplexer DMUX3 through the output line Y1.

The data driving circuit 200*b*-2 alternately and sequentially outputs a second color data signal BD2 and a second color data signal BD6 to the demultiplexer DMUX3 through the output line Y2.

The data driving circuit 200*b*-2 sequentially outputs first color data signals GD4 to the demultiplexer DMUX3 through the output line Y3.

The data driving circuit 200*b*-2 sequentially outputs first color data signals GD5 to the demultiplexer DMUX3 through the output line Y4.

The data driving circuit 200*b*-2 alternately and sequentially outputs a third color data signal RD3 and a third color data signal RD7 to the demultiplexer DMUX3 through the output line Y5.

The data driving circuit 200*b*-2 sequentially outputs first color data signals GD8 to the demultiplexer DMUX3 through the output line Y6.

The first and second switching signals CLA and CLB are sequentially set to low levels (expressed another way, activated at low levels) in each of horizontal periods H1, H2, H3, and H4. For example, during the horizontal period H1, the first switching signal CLA is activated at a low level, and thereafter the second switching signal CLB is activated at a low level. In an embodiment, the low level section of the first switching signal CLA does not overlap the low level section of the second switching signal CLB.

When the first switching signal CLA is at the low level, the demultiplexer DMUX3 outputs the second color data signal BD2 and the third color data signal RD3 from the output lines Y2 and Y5 to the data lines DL2 and DL3.

When the second switching signal CLB is at the low level, the demultiplexer DMUX3 outputs the second color data signal BD6 and the third color data signal RD7 from the output lines Y2 and Y5 to the data lines DL6 and DL7.

Accordingly, the first color data signal GD1, the second color data signal BD2, the third color data signal RD3, the first color data signal GD4, the first color data signal GD5, the second color data signal BD6, the third color data signal RD7, and the first color data signal GD8 may be provided to the data lines DL1, DL2, DL3, DL4, DL5, DL6, DL7, and DL8, respectively.

The data driving circuit 200*b*-2 may output the first color data signals GD1, GD4, GD5, and GD8 to the output lines Y1, Y3, Y4, and Y6 in each of the horizontal periods H1, H2, H3, and H4. The data driving circuit 200*b*-2 may output the second color data signals BD2 and BD6 to the output line Y2 in each of the horizontal periods H1, H2, H3, and H4. The data driving circuit 200*b*-2 may output the third color data signals RD3 and RD7 to the output line Y5 in each of the horizontal periods H1, H2, H3, and H4.

Accordingly, unnecessary charging and discharging operations in the output lines Y1 to Y6 are reduced. Thus, power consumption of the data driving circuit 200*b*-2 may be minimized.

Figure 14A:
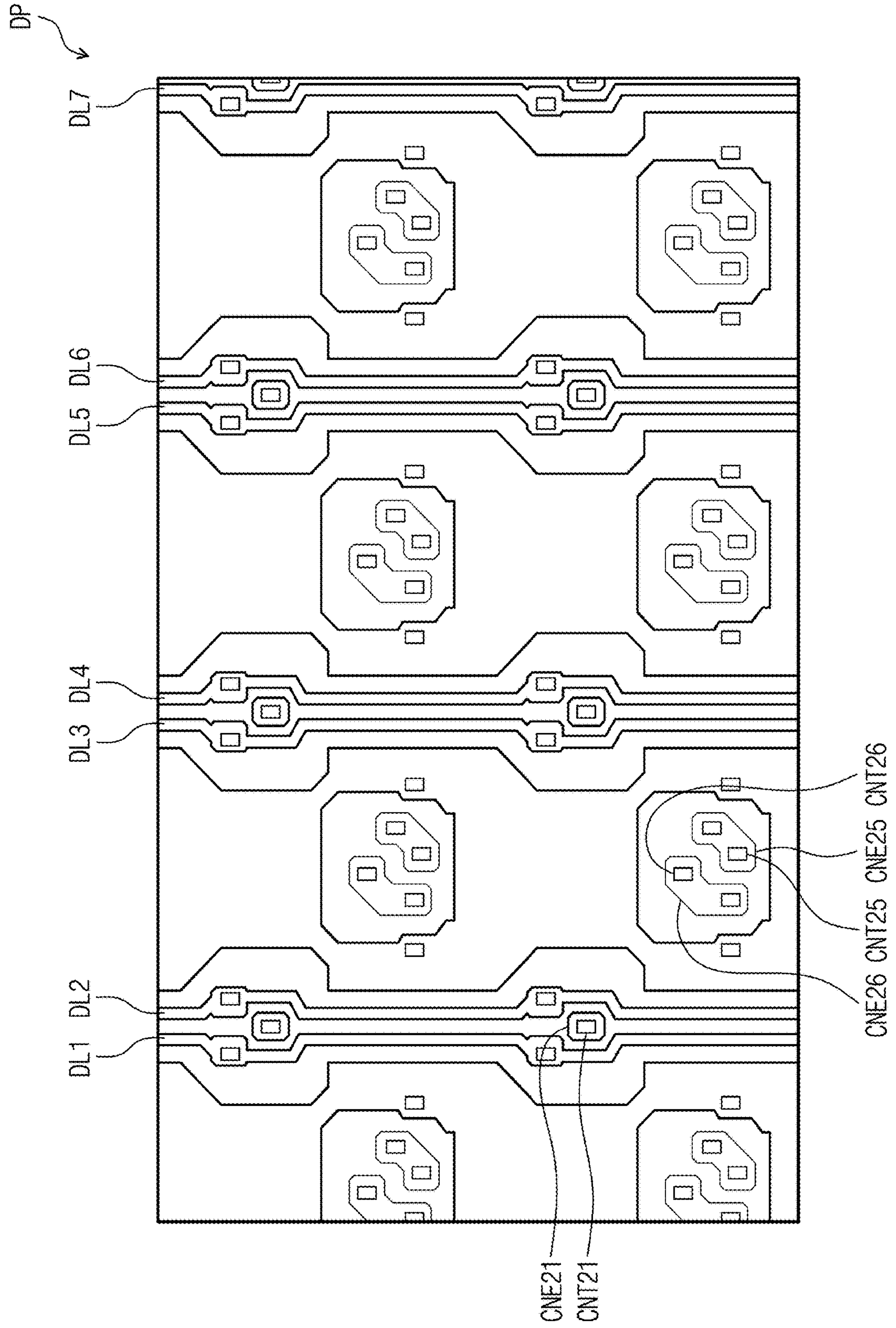
FIGS. 14A and 14B are plan views of a display panel according to an embodiment of the present disclosure.
Figure 14B:
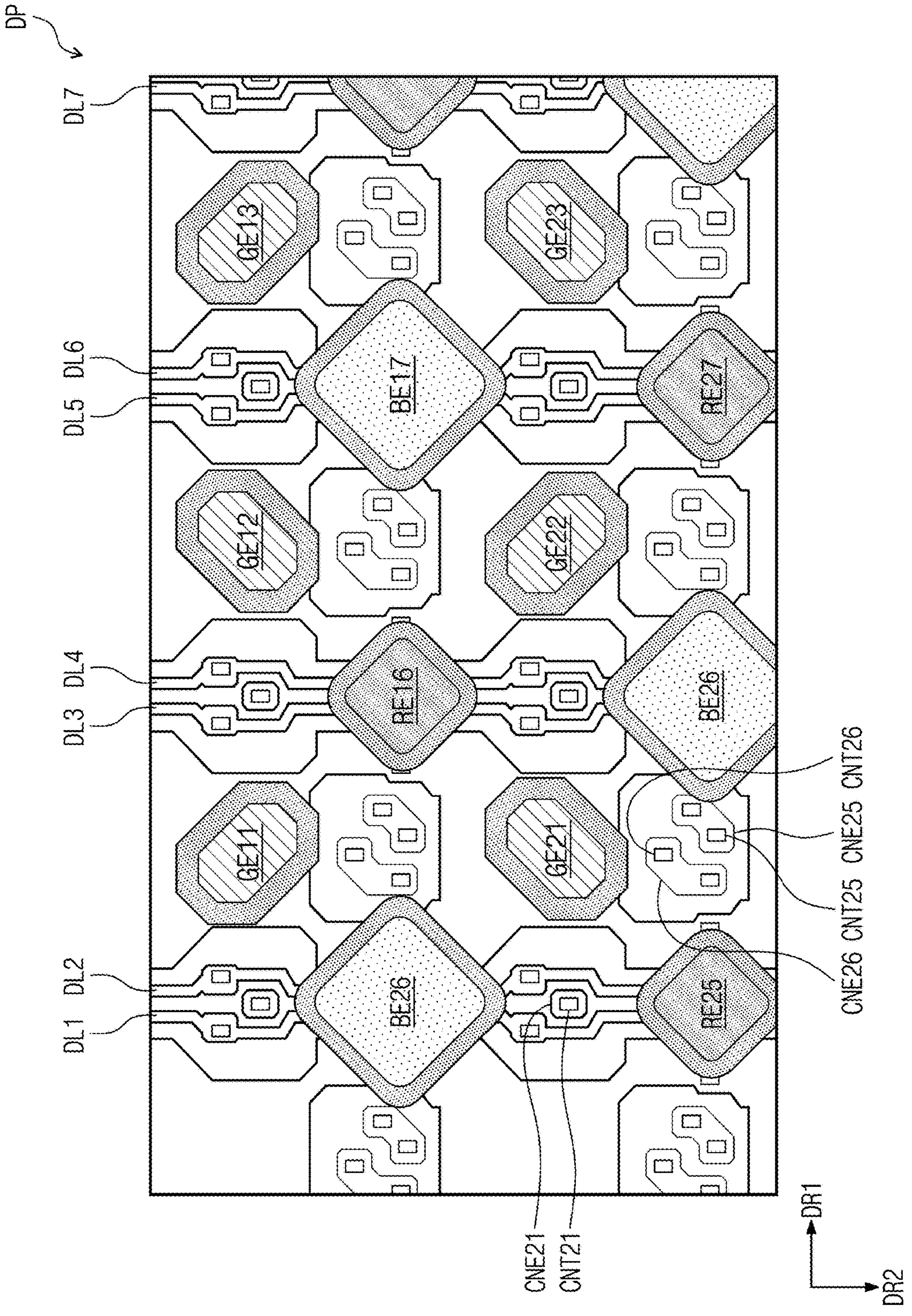

FIGS. 14A and 14B are plan views of the display panel DP according to an embodiment of the present disclosure.

FIG. 14A is a plan view of the display panel DP in a state in which the first to third light emitting elements are not disposed. FIG. 14B is a plan view of the display panel DP in a state in which the first to third light emitting elements are disposed.

The plan views of FIGS. 14A and 14B are merely illustrative, and embodiments of the present disclosure are not limited thereto.

Referring to FIGS. 5, 2, 14A, and 14B, the anode GAE21 of the first light emitting element GE21 may be connected with the connecting line CL21 through the contact hole CNT21 of the connecting electrode CNE21. In some aspects, the connecting line CL21 may be connected to the second electrode D6 of the sixth transistor T6 in the $21^{st}$ pixel circuit PC21 through the contact hole CT21*a*. The contact hole CNT21 may be disposed between the data lines DL1 and DL2 when viewed from above the plane. Since the contact hole CNT21 is disposed between the data lines DL1 and DL2, the degree of freedom in the size and position of the anode GAE21 of the first light emitting element GE21 may be improved.

Referring to FIGS. 6, 10, 14A, and 14B, the connecting electrode CNE25 may be electrically connected with the anode RAE25 of the third light emitting element RE25 through the contact hole CT25 and may be electrically connected with the connecting line CL25 through the contact hole CNT25.

Referring to FIGS. 7, 10, 14A, and 14B, the connecting electrode CNE26 may be electrically connected with the anode BAE26 of the second light emitting element BE26 through the contact hole CT26 and may be electrically connected with the connecting line CL26 through the contact hole CNT26.

In an embodiment, the contact holes CNT25 and CNT26 may be disposed between the data lines DL2 and DL3 when viewed from above the plane. That is, the contact holes CNT25 and CNT26 may be disposed between the third light emitting element RE25 and the second light emitting element BE26.

Figure 15:
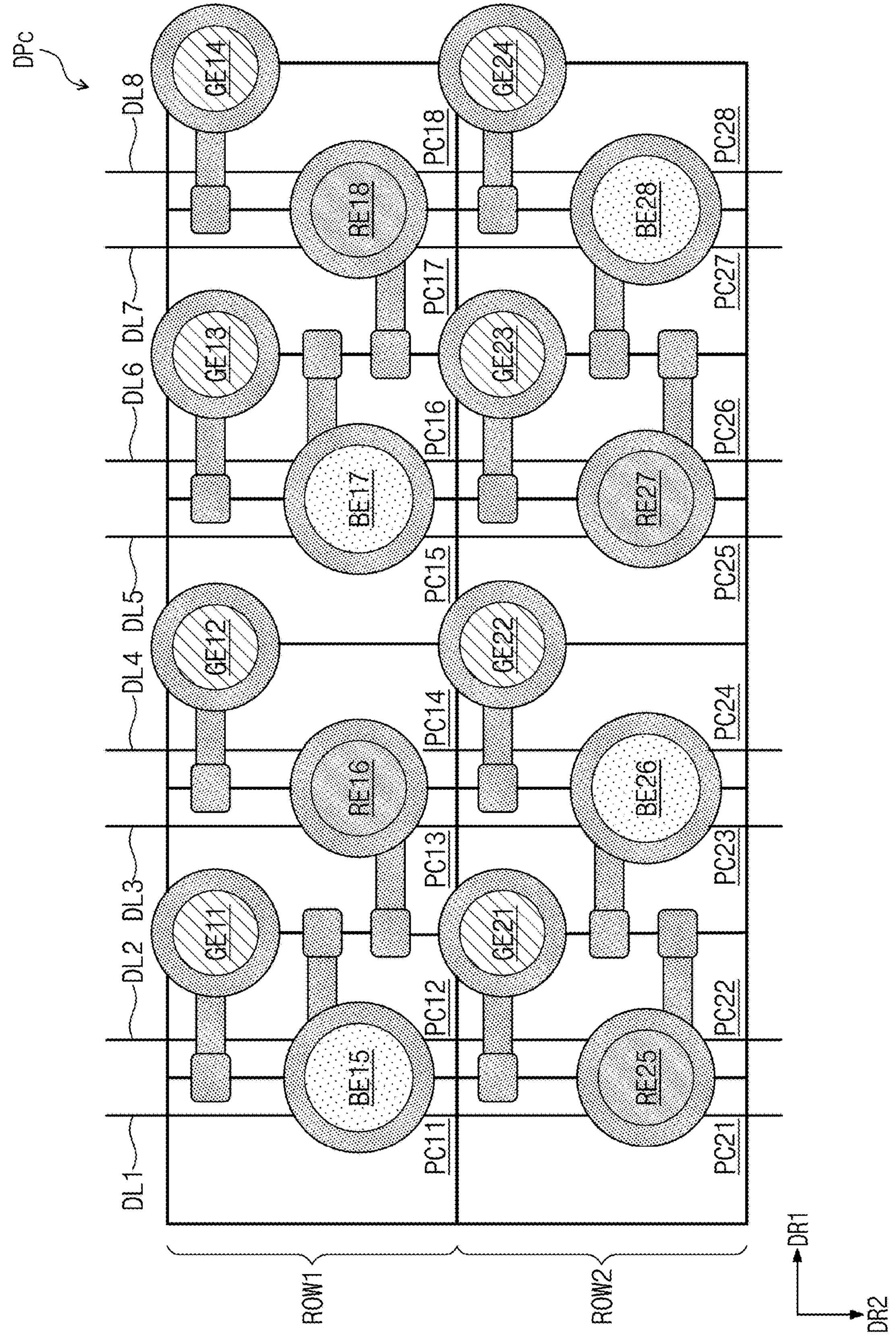
FIG. 15 is a view illustrating a display panel according to an embodiment of the present disclosure.

FIG. 15 is a view illustrating a display panel DPc according to an embodiment of the present disclosure.

Components of the display panel DPc illustrated in FIG. 15 are similar to the components of the display panel DPa illustrated in FIG. 2. Therefore, the components of the display panel DPc illustrated in FIG. 15 will be assigned with the identical reference numerals, and repetitive descriptions will be omitted.

The first light emitting elements GE11 to GE14 and GE21 to GE24, the second light emitting elements BE15, BE17, BE26, and BE28, and the third light emitting elements RE16, RE18, RE25, and RE27 of the display panel DPa illustrated in FIG. 2 have polygonal shapes.

First light emitting elements GE11 to GE14 and GE21 to GE24, second light emitting elements BE15, BE17, BE26, and BE28, and third light emitting elements RE16, RE18, RE25, and RE27 of the display panel DPc illustrated in FIG. 15 have circular shapes.

As described herein, the shapes of the first light emitting elements GE11 to GE14 and GE21 to GE24, the second light emitting elements BE15, BE17, BE26, and BE28, and the third light emitting elements RE16, RE18, RE25, and RE27 may be modified in various ways.

A connection relationship between $11^{th}$ to $18^{th}$ pixel circuits PC11 to PC18 and the $21^{st}$ to $28^{th}$ pixel circuits PC21 to PC28 and the first light emitting elements GE11 to GE14 and GE21 to GE24, the second light emitting elements BE15, BE17, BE26, and BE28, and the third light emitting elements RE16, RE18, RE25, and RE27 illustrated in FIG. 15 may be the same as that described with reference to FIG. 8.

Figure 16:
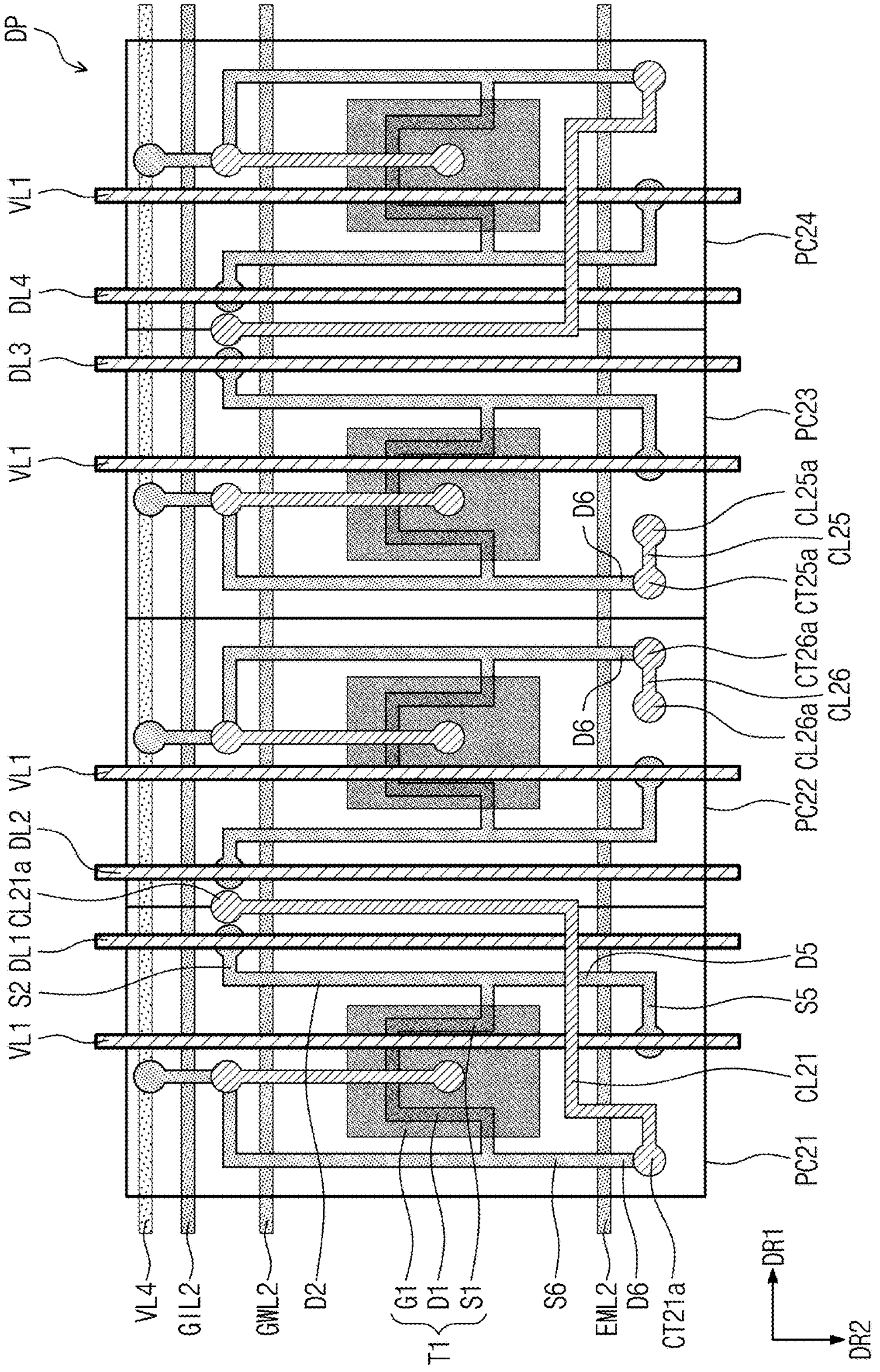
FIG. 16 is a view illustrating signal lines and connecting lines disposed in a display panel according to an embodiment of the present disclosure.

FIG. 16 is a view illustrating the signal lines and the connecting lines disposed in the display panel DP.

In FIG. 16, some of the signal lines and the connecting lines disposed in the $21^{st}$ to $24^{th}$ pixel circuits PC21 to PC24 illustrated in FIG. 2 are illustrated. The signal lines and the connecting lines illustrated in FIG. 16 are merely examples for a better understanding of the present disclosure, and embodiments of the present disclosure are not limited thereto. The arrangement order, line widths, and shapes of the signal lines and the connecting lines may be modified in various ways.

Referring to FIGS. 2, 3, and 16, the fourth driving voltage line VL4, the scan lines GIL2 and GWL2, and the emission control line EML2 extend in the first direction DR1 in each of the $21^{st}$ to $24^{th}$ pixel circuits PC21 to PC24. The first driving voltage line VL1 and the data lines DL1, DL2, DL3, and DLA extend in the second direction DR2.

In each of the $21^{st}$ to $24^{th}$ pixel circuits PC21 to PC24, the first electrode S2 of the second transistor T2 may be connected with a corresponding data line among the data lines DL1 to DL4. The second electrode D2 of the second transistor T2 may be connected with the first electrode S1 of the first transistor T1. The first electrode S5 of the fifth transistor T5 may be connected with the first driving voltage line VL1. The second electrode D5 of the fifth transistor T5 may be connected with the first electrode S1 of the first transistor T1. The first electrode S6 of the sixth transistor T6 may be connected with the second electrode D1 of the first transistor T1.

The second electrode D6 of the sixth transistor T6 in the $21^{st}$ pixel circuit PC21 may be connected with the anode GAE21 of the first light emitting element GE21 through the connecting line CL21.

In an embodiment, the $21^{st}$ pixel circuit PC21 and the $22^{nd}$ pixel circuit PC22 may have shapes symmetrical to each other with respect to a virtual reference line extending in the second direction DR2. The $22^{nd}$ pixel circuit PC22 and the $23^{rd}$ pixel circuit PC23 may have shapes symmetrical to each other with respect to a virtual reference line extending in the second direction DR2. The $23^{rd}$ pixel circuit PC23 and the $24^{th}$ pixel circuit PC24 may have shapes symmetrical to each other with respect to a virtual reference line extending in the second direction DR2.

Referring to FIGS. 5 and 16, one end CL21*a* of the connecting line CL21 is connected with the connecting electrode CNE21. That is, the connecting line CL21 may be connected with the anode GAE21 of the first light emitting element GE21 through the connecting electrode CNE21. The connecting line CL21 may be connected with the second electrode D6 of the sixth transistor T6 in the $21^{st}$ pixel circuit PC21 through the contact hole CT21*a*.

Referring to FIGS. 6 and 16, the connecting line CL25 may be connected with the second electrode D6 of the sixth transistor T6 in the $23^{rd}$ pixel circuit PC23 through the contact hole CT25*a*. One end CL25*a* of the connecting line CL25 is connected with the connecting electrode CNE25. Accordingly, the second electrode D6 of the sixth transistor T6 in the 23$^{rd}$ pixel circuit PC23 may be connected with the anode RAE25 of the third light emitting element RE25 through the connecting line CL25 and the connecting electrode CNE25.

Referring to FIGS. 7 and 16, the connecting line CL26 may be connected with the second electrode D6 of the sixth transistor T6 in the 22$^{nd}$ pixel circuit PC22 through the contact hole CT26*a*. One end CL26*a* of the connecting line CL26 is connected with the connecting electrode CNE26. Accordingly, the second electrode D6 of the sixth transistor T6 in the 22$^{nd}$ pixel circuit PC22 may be connected with the anode BAE26 of the second light emitting element BE26 through the connecting line CL26 and the connecting electrode CNE26.

Figure 17:
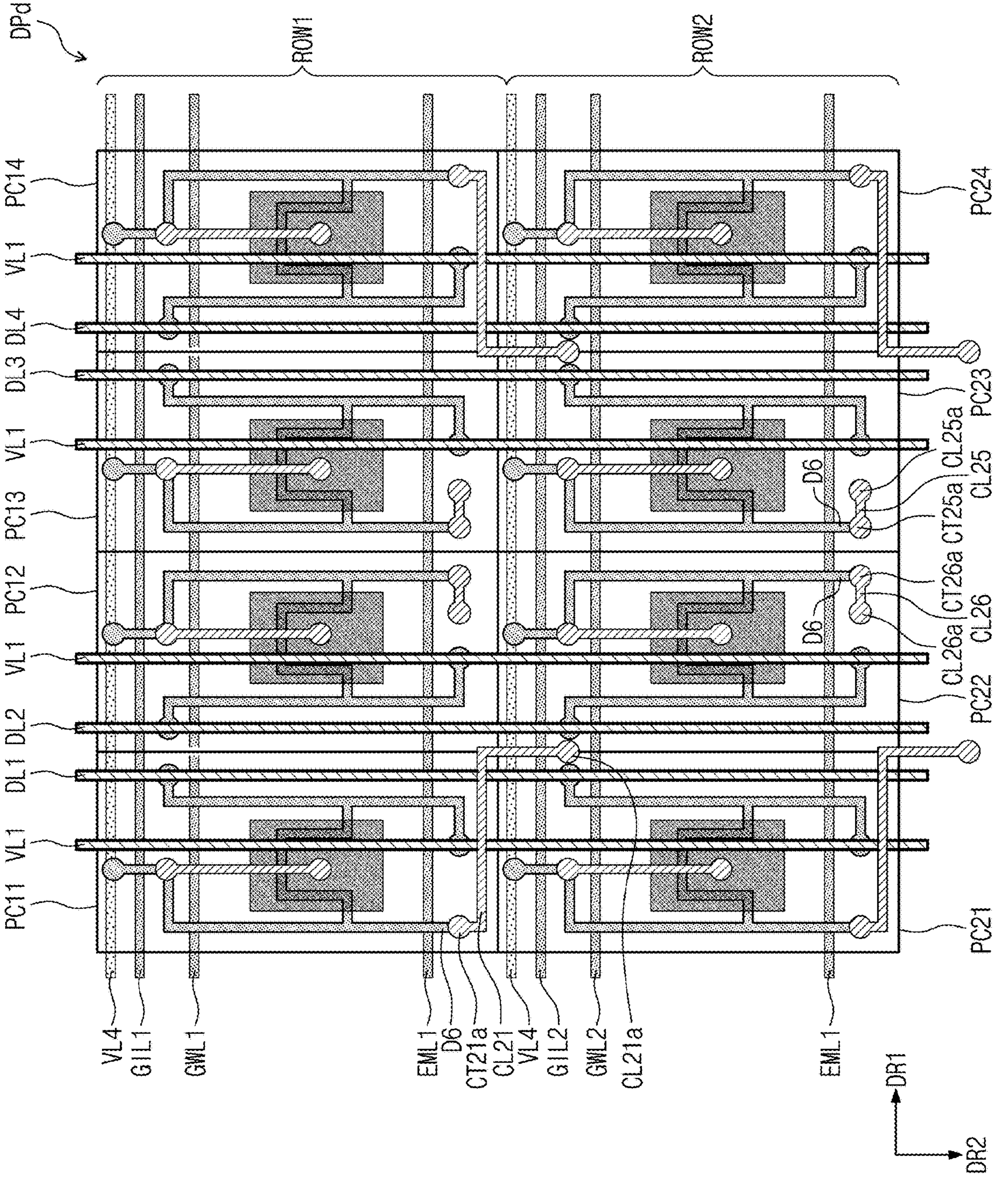
FIG. 17 is a view illustrating signal lines and connecting lines disposed in a display panel according to an embodiment of the present disclosure.

FIG. 17 is a view illustrating signal lines and connecting lines disposed in a display panel DPd according to an embodiment of the present disclosure.

In FIG. 17, some of the signal lines and the connecting lines disposed in the 11$^{th}$ to 14$^{th}$ pixel circuits PC11 to PC14 and the 21$^{st}$ to 24$^{th}$ pixel circuits PC21 to PC24 illustrated in FIG. 2 are illustrated. The signal lines and the connecting lines illustrated in FIG. 17 are merely examples for a better understanding of the present disclosure, and embodiments of the present disclosure are not limited thereto. The arrangement order, line widths, and shapes of the signal lines and the connecting lines may be modified in various ways.

Among the signal lines and the connecting lines of the display panel DPd illustrated in FIG. 17, signal lines and connecting lines that are identical to the signal lines and the connecting lines of the display panel DP illustrated in FIG. 16 will be assigned with the identical reference numerals, and repetitive descriptions will be omitted.

Referring to FIGS. 5 and 17, one end CL21*a* of a connecting line CL21 is connected with a connecting electrode CNE21. That is, the connecting line CL21 may be connected with an anode GAE21 of a first light emitting element GE21 in the second row ROW2 through the connecting electrode CNE21. The connecting line CL21 may be connected with a second electrode D6 of a sixth transistor T6 in the 11$^{th}$ pixel circuit PC11 in the first row ROW1 through a contact hole CT21*a*. That is, the anode GAE21 of the first light emitting element GE21 in the second row ROW2 is electrically connected with the 11$^{th}$ pixel circuit PC11 in the first row ROW1.

Since the first light emitting element GE21 disposed in the second row ROW2 is connected to the 11$^{th}$ pixel circuit PC11 disposed in the first row ROW1 as described herein, the connecting line CL21 may be shorter than the connecting line CL21 illustrated in FIG. 16. In this case, the first light emitting elements GE21 and GE14 in the first row ROW1 illustrated in FIG. 2 may be dummy elements that do not emit light.

Referring to FIGS. 6 and 17, a connecting line CL25 may be connected with a second electrode D6 of a sixth transistor T6 in the 23$^{rd}$ pixel circuit PC23 through a contact hole CT25*a*. One end CL25*a* of the connecting line CL25 is connected with a connecting electrode CNE25. Accordingly, the second electrode D6 of the sixth transistor T6 in the 23$^{rd}$ pixel circuit PC23 may be connected with an anode RAE25 of a third light emitting element RE25 through the connecting line CL25 and the connecting electrode CNE25.

Referring to FIGS. 7 and 17, a connecting line CL26 may be connected with a second electrode D6 of a sixth transistor T6 in the 22$^{nd}$ pixel circuit PC22 through a contact hole CT26*a*. One end CL26*a* of the connecting line CL26 is connected with a connecting electrode CNE26. Accordingly, the second electrode D6 of the sixth transistor T6 in the 22$^{nd}$ pixel circuit PC22 may be connected with an anode BAE26 of a second light emitting element BE26 through the connecting line CL26 and the connecting electrode CNE26.

Figure 18:
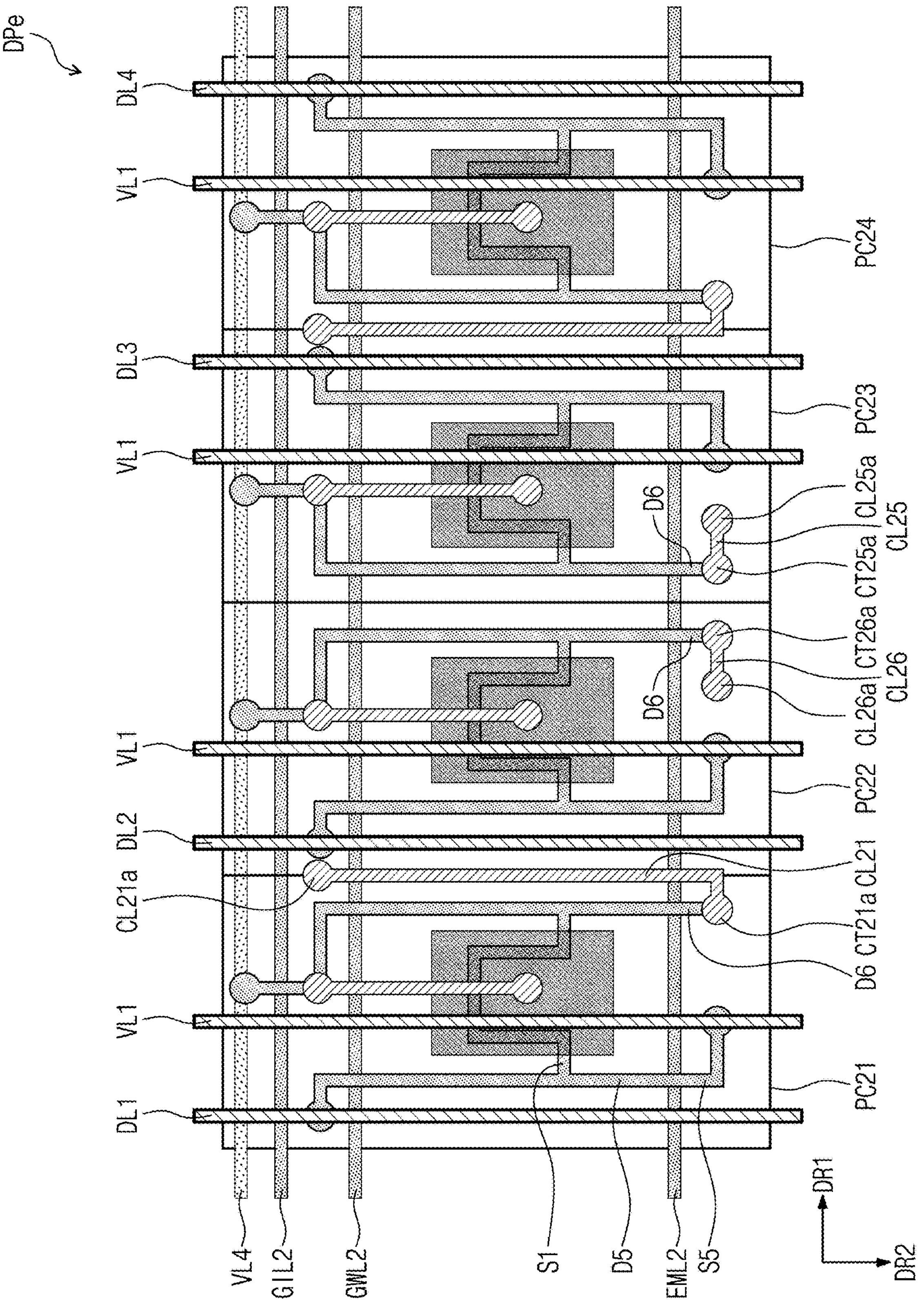
FIG. 18 is a view illustrating signal lines and connecting lines disposed in a display panel according to an embodiment of the present disclosure.

FIG. 18 is a view illustrating signal lines and connecting lines disposed in a display panel DPe according to an embodiment of the present disclosure.

In FIG. 18, some of the signal lines and the connecting lines disposed in the 21$^{st}$ to 24$^{th}$ pixel circuits PC21 to PC24 illustrated in FIG. 2 are illustrated. The signal lines and the connecting lines illustrated in FIG. 18 are merely examples for a better understanding of the present disclosure, and embodiments of the present disclosure are not limited thereto. The arrangement order, line widths, and shapes of the signal lines and the connecting lines may be modified in various ways.

Among the signal lines and the connecting lines of the display panel DPe illustrated in FIG. 18, signal lines and connecting lines that are identical to the signal lines and the connecting lines of the display panel DP illustrated in FIG. 16 will be assigned with the identical reference numerals, and repetitive descriptions will be omitted.

Referring to FIGS. 2, 3, and 18, a fourth driving voltage line VL4, scan lines GIL2 and GWL2, and an emission control line EML2 extend in the first direction DR1 in each of the 21$^{st}$ to 24$^{th}$ pixel circuits PC21 to PC24. A first driving voltage line VL1 and data lines DL1, DL2, DL3, and DL4 extend in the second direction DR2.

In the display panel DP illustrated in FIG. 16 and the display panel DPd illustrated in FIG. 17, two data lines are disposed adjacent to each other. That is, the data lines DL1 and DL2 are disposed adjacent to each other, and the data lines DL3 and DL4 are disposed adjacent to each other. In some aspects, the one end CL21*a* of the connecting line CL21 is disposed between the data lines DL1 and DL2.

The data lines DL1, DL2, DL3, and DL4 of the display panel DPe illustrated in FIG. 18 are disposed on first sides of the 21$^{st}$ to 24$^{th}$ pixel circuits PC21 to PC24. For example, the data lines DL1 and DL2 are disposed on the left sides of the 21$^{st}$ and 22$^{nd}$ pixel circuits PC21 and PC22 to overlap the 21$^{st}$ and 22$^{nd}$ pixel circuits PC21 and PC22, respectively. The data lines DL3 and DL4 are disposed on the right sides of the 23$^{rd}$ and 24$^{th}$ pixel circuits PC23 and PC24 to overlap the 23$^{rd}$ and 24$^{th}$ pixel circuits PC23 and PC24, respectively.

In an embodiment, the 21$^{st}$ and 22$^{nd}$ pixel circuits PC21 and PC22 and the 23$^{rd}$ and 24$^{th}$ pixel circuits PC23 and PC24 may be symmetrical to each other with respect to a virtual reference line between the 22$^{nd}$ and 23$^{rd}$ pixel circuits PC22 and PC23 that extends in the second direction DR2.

In each of the 21$^{st}$ to 24$^{th}$ pixel circuits PC21 to PC24, a first electrode S5 of a fifth transistor T5 may be connected with the first driving voltage line VL1. A second electrode D5 of the fifth transistor T5 may be connected with the data line DL1 and a first electrode S1 of a first transistor T1.

Referring to FIGS. 5 and 18, one end CL21*a* of a connecting line CL21 is connected with a connecting electrode CNE21. That is, the connecting line CL21 may be connected with an anode GAE21 of a first light emitting element GE21 through the connecting electrode CNE21. The connecting line CL21 may be connected with a second electrode D6 of a sixth transistor T6 in the 21$^{st}$ pixel circuit PC21 through a contact hole CT21*a*.

Referring to FIGS. 6 and 18, a connecting line CL25 may be connected with a second electrode D6 of a sixth transistor T6 in the 23$^{rd}$ pixel circuit PC23 through a contact hole CT25*a*. One end CL25*a* of the connecting line CL25 is connected with a connecting electrode CNE25. Accordingly, the second electrode D6 of the sixth transistor T6 in the 23$^{rd}$ pixel circuit PC23 may be connected with an anode RAE25 of a third light emitting element RE25 through the connecting line CL25 and the connecting electrode CNE25.

Referring to FIGS. 7 and 18, a connecting line CL26 may be connected with a second electrode D6 of a sixth transistor T6 in the 22$^{nd}$ pixel circuit PC22 through a contact hole CT26*a*. One end CL26*a* of the connecting line CL26 is connected with a connecting electrode CNE26. Accordingly, the second electrode D6 of the sixth transistor T6 in the 22$^{nd}$ pixel circuit PC22 may be connected with an anode BAE26 of a second light emitting element BE26 through the connecting line CL26 and the connecting electrode CNE26.

Figure 19:
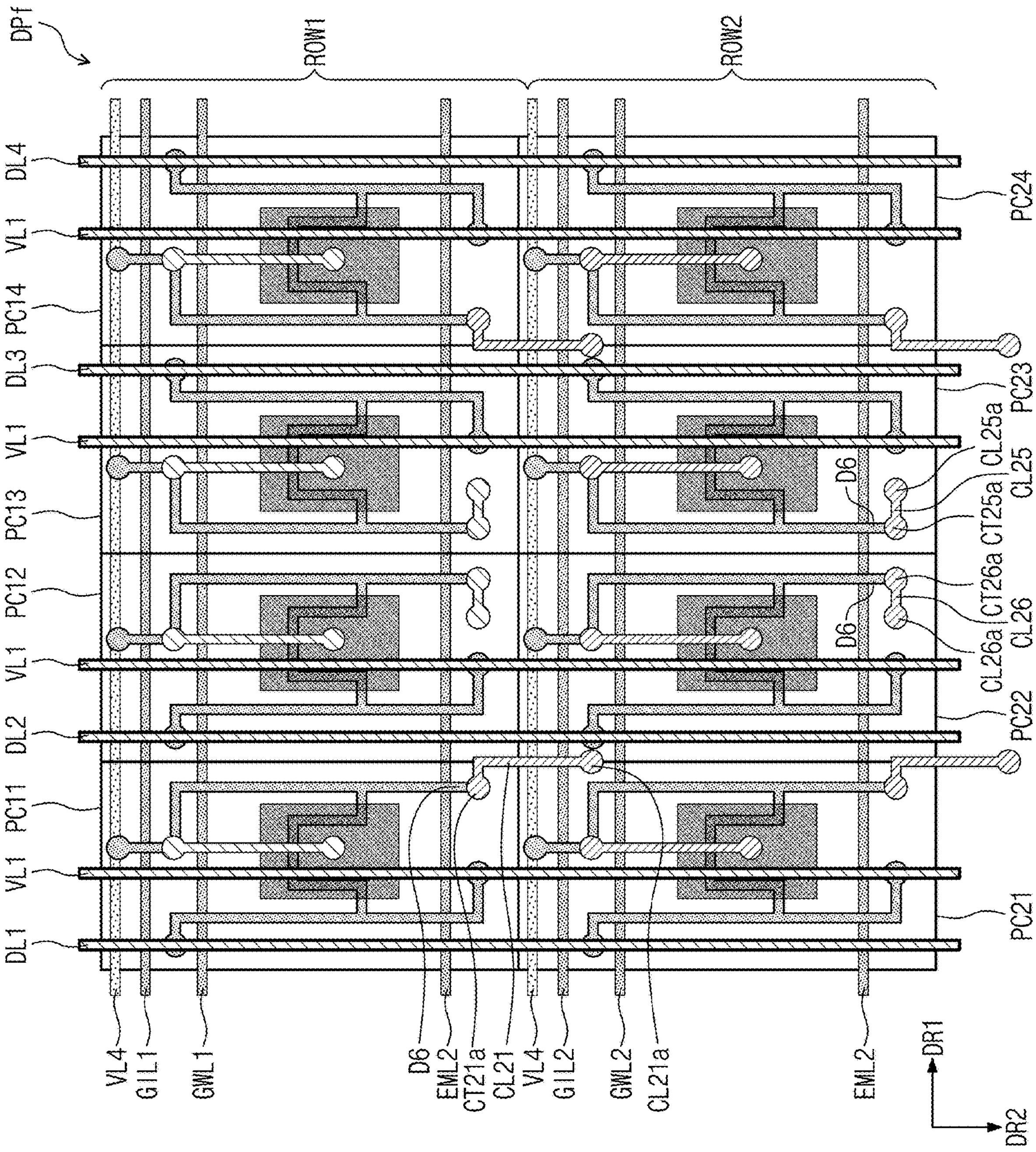
FIG. 19 is a view illustrating signal lines and connecting lines disposed in a display panel according to an embodiment of the present disclosure.

FIG. 19 is a view illustrating signal lines and connecting lines disposed in a display panel DPf according to an embodiment of the present disclosure.

In FIG. 19, some of the signal lines and the connecting lines disposed in the 11$^{th}$ to 14$^{th}$ pixel circuits PC11 to PC14 and the 21$^{st}$ to 24$^{th}$ pixel circuits PC21 to PC24 illustrated in FIG. 2 are illustrated. The signal lines and the connecting lines illustrated in FIG. 19 are merely examples for a better understanding of the present disclosure, and embodiments of the present disclosure are not limited thereto. The arrangement order, line widths, and shapes of the signal lines and the connecting lines may be modified in various ways.

Among the signal lines and the connecting lines of the display panel DPf illustrated in FIG. 19, signal lines and connecting lines that are identical to the signal lines and the connecting lines of the display panel DP illustrated in FIG. 16 will be assigned with the identical reference numerals, and repetitive descriptions will be omitted.

Referring to FIGS. 5 and 19, one end CL21*a* of a connecting line CL21 is connected with a connecting electrode CNE21. That is, the connecting line CL21 may be connected with an anode GAE21 of a first light emitting element GE21 in the second row ROW2 through the connecting electrode CNE21. The connecting line CL21 may be connected with a second electrode D6 of a sixth transistor T6 in the 11$^{th}$ pixel circuit PC11 in the first row ROW1 through a contact hole CT21*a*. That is, the anode GAE21 of the first light emitting element GE21 in the second row ROW2 is electrically connected with the 11$^{th}$ pixel circuit PC11 in the first row ROW1.

Since the first light emitting element GE21 disposed in the second row ROW2 is connected to the 11$^{th}$ pixel circuit PC11 disposed in the first row ROW1 as described herein, the connecting line CL21 may be shorter than the connecting line CL21 illustrated in FIG. 18. In this case, the first light emitting elements GE21 and GE14 in the first row ROW1 illustrated in FIG. 2 may be dummy elements that do not emit light.

Referring to FIGS. 6 and 19, a connecting line CL25 may be connected with a second electrode D6 of a sixth transistor T6 in the 23$^{rd}$ pixel circuit PC23 through a contact hole CT25*a*. One end CL25*a* of the connecting line CL25 is connected with a connecting electrode CNE25. Accordingly, the second electrode D6 of the sixth transistor T6 in the 23$^{rd}$ pixel circuit PC23 may be connected with an anode RAE25 of a third light emitting element RE25 through the connecting line CL25 and the connecting electrode CNE25.

Referring to FIGS. 7 and 19, a connecting line CL26 may be connected with a second electrode D6 of a sixth transistor T6 in the 22$^{nd}$ pixel circuit PC22 through a contact hole CT26*a*. One end CL26*a* of the connecting line CL26 is connected with a connecting electrode CNE26. Accordingly, the second electrode D6 of the sixth transistor T6 in the 22$^{nd}$ pixel circuit PC22 may be connected with an anode BAE26 of a second light emitting element BE26 through the connecting line CL26 and the connecting electrode CNE26.

Figure 20:
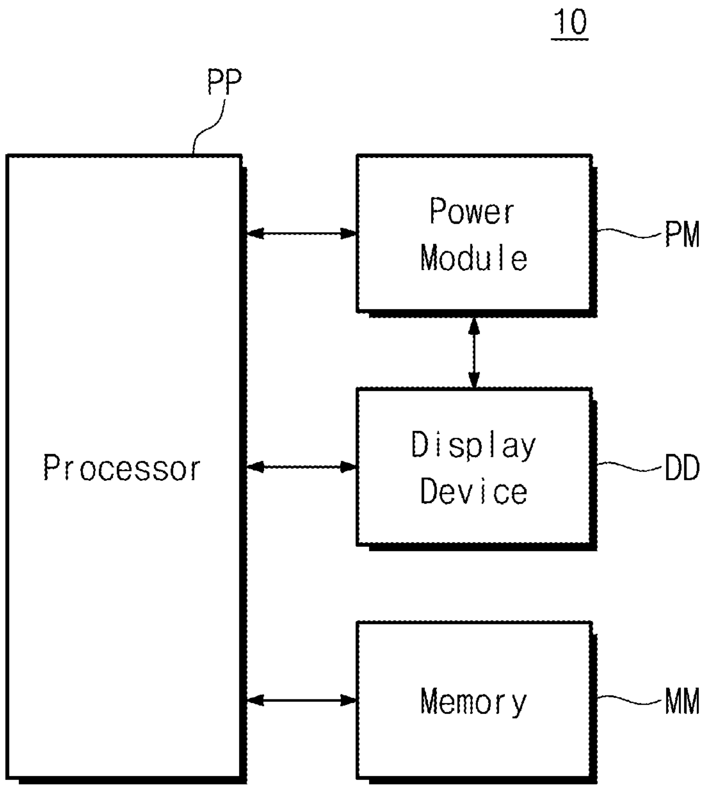
FIG. 20 is a block diagram of an electronic device according to an embodiment of the present disclosure.

FIG. 20 is a block diagram of an electronic device according to an embodiment of the present disclosure.

Referring to FIG. 20, an electronic device 10 according to an embodiment of the present disclosure may include a processor PP, a power module PM, a display device DD and a memory MM.

The processor PP may include at least one of a central processing unit (CPU), an application processor (AP), a graphic processing unit (GPU), a communication processor (CP), an image signal processor (ISP) and a controller.

The display device DD may include the same configuration as that illustrated in FIGS. 1 to 19.

According to an embodiment, the driving controller 100 of the display device DD illustrated in FIG. 1 may receive the input image signal RGB and the control signal CTRL from the processor PP.

The memory MM may store data information necessary for the operation of the processor PP or the display device DD. When the processor PP executes an application stored in the memory MM, an image data signal and/or an input control signal is transmitted to the display device DD, and the display device DD can process the received signal and output image information through the display screen.

The power module PM may include a power supply module such as a power adapter or a battery device, and a power conversion module that converts the power supplied by the power supply module to generate power necessary for the operation of the electronic device 10.

The display device having the above-described configuration may output only a data signal corresponding to one color to one data line. Accordingly, power consumption of the display device may be reduced.

In some aspects, a difference in coupling capacitance between data lines may be minimized, and thus deterioration in display quality may be prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display panel comprising:

a first data line through a fourth data line;

a first pixel circuit through a fourth pixel circuit connected to the first data line through the fourth data line, respectively; and a first light emitting element through a fourth light emitting element connected to the first pixel circuit through the fourth pixel circuit, respectively, wherein each of the first data line and the fourth data line transfers a first color data signal, the second data line transfers a second color data signal, and the third data line transfers a third color data signal, wherein the first light emitting element and the fourth light emitting element emit light of a first color, the second light emitting element emits light of a second color, and the third light emitting element emits light of a third color, wherein the third light emitting element, the first light emitting element, the second light emitting element, and the fourth light emitting element are sequentially arranged in a first direction, and wherein the first light emitting element through the third light emitting element include a first extending line through a third extending line, respectively, the first extending line through the third extending line are connected to the first pixel circuit through the third pixel circuit through a first contact hole through a third contact hole, respectively, and the second contact hole and the third contact hole are disposed between the second light emitting element and the third light emitting element.

2. The display panel of claim 1, wherein the fourth light emitting element includes a fourth extending line, and wherein the fourth extending line is connected to the fourth pixel circuit through a fourth contact hole.

3. The display panel of claim 2, wherein each of the first light emitting element through the fourth light emitting element includes an anode and a cathode, and wherein the first extending line through the fourth extending line extend from the anodes of the first light emitting element through the fourth light emitting element, respectively.

4. The display panel of claim 2, wherein the first extending line, the second extending line, and the fourth extending line extend from the first light emitting element, the second light emitting element, and the fourth light emitting element, respectively, in a direction opposite to the first direction, and wherein the third extending line extends from the third light emitting element in the first direction.

5. The display panel of claim 1, wherein the first data line and the second data line are disposed adjacent to each other, and the first contact hole is disposed between the first data line and the second data line.

6. The display panel of claim 5, further comprising:

a demultiplexer configured to connect a first output line and a second output line to the first data line and the fourth data line, respectively, in response to a first switching signal and connect the first output line and a second output line to the second data line and the third data line, respectively, in response to a second switching signal.

7. The display panel of claim 1, further comprising:

a demultiplexer configured to selectively connect a first output line, a second output line, and a third output line to the first data line through the fourth data line, wherein the demultiplexer:

connects the first output line and the third output line to the first data line and the fourth data line;

connects the second output line to the second data line in response to a first switching signal; and connects the second output line to the third data line in response to a second switching signal.

8. The display panel of claim 1, wherein the first pixel circuit includes:

a first transistor including a first electrode, a second electrode, and a gate electrode;

a sixth transistor including a first electrode connected with the second electrode of the first transistor, a second electrode, and a gate electrode connected with an emission control line; and a connecting line configured to connect the first contact hole and the second electrode of the sixth transistor.

9. The display panel of claim 8, wherein the display panel further includes:

a base layer;

a circuit element layer disposed on the base layer, the circuit element layer including the first pixel circuit, the connecting line, and a connecting electrode disposed on the connecting line; and a display element layer disposed on the circuit element layer, the display element layer including the first light emitting element, wherein the connecting line is disposed on the second electrode of the sixth transistor and electrically connected to the second electrode of the sixth transistor, wherein the connecting electrode is disposed on the connecting line and connected with the connecting line, and wherein the first light emitting element is connected with the connecting line through the first contact hole.

10. The display panel of claim 1, wherein the second pixel circuit includes:

a first transistor including a first electrode, a second electrode, and a gate electrode;

a sixth transistor including a first electrode connected with the second electrode of the first transistor, a second electrode, and a gate electrode connected with an emission control line; and a connecting line configured to connect the second contact hole and the second electrode of the sixth transistor.

11. The display panel of claim 10, wherein the display panel further includes:

a base layer;

a circuit element layer disposed on the base layer, the circuit element layer including the second pixel circuit, the connecting line, and a connecting electrode disposed on the connecting line; and a display element layer disposed on the circuit element layer, the display element layer including the second light emitting element, wherein the connecting line is disposed on the second electrode of the sixth transistor and electrically connected to the second electrode of the sixth transistor, wherein the connecting electrode is disposed on the connecting line and connected with the connecting line, and wherein the second light emitting element is connected with the connecting line through the second contact hole.

12. A display device comprising:

a display panel including a first data line through a fourth data line;

a data driving circuit electrically connected with a first output line and a second output line; and a demultiplexer configured to connect the first output line and the second output line to the second data line and the third data line in response to a first switching signal and connect the first output line and the second output line to the first data line and the fourth data line in response to a second switching signal, wherein the display panel includes:

a first pixel circuit through a fourth pixel circuit connected to the first data line through the fourth data line, respectively; and a first light emitting element to a fourth light emitting element connected to the first pixel circuit through the fourth pixel circuit, respectively, wherein each of the first data line and the fourth data line transfers a first color data signal, the second data line transfers a second color data signal, and the third data line transfers a third color data signal, wherein the first light emitting element and the fourth light emitting element emit light of a first color, the second light emitting element emits light of a second color, and the third light emitting element emits light of a third color, and wherein the third light emitting element, the first light emitting element, the second light emitting element, and the fourth light emitting element are sequentially arranged in a first direction.

13. The display device of claim 12, wherein the data driving circuit outputs the first color data signal to the first output line and the second output line when the first switching signal is at an activation level, and the data driving circuit outputs the second color data signal and the third color data signal to the first output line and the second output line, respectively, when the second switching signal is at the activation level.

14. The display device of claim 13, wherein the first light emitting element through the fourth light emitting element include a first extending line through a fourth extending line, respectively, wherein the first extending line through the fourth extending line are connected to the first pixel circuit through the fourth pixel circuit through a first contact hole through a fourth contact hole, respectively, and wherein the second contact hole and the third contact hole are disposed between the second light emitting element and the third light emitting element.

15. The display device of claim 14, wherein the first data line and the second data line are disposed adjacent to each other, and the first contact hole is disposed between the first data line and the second data line.

16. An electronic device for provide an image, comprising:

a display panel; and a data driving circuit electrically connected with the display panel, wherein the display panel includes:

a first data line through a fourth data line;

a first pixel circuit through a fourth pixel circuit connected to the first data line through the fourth data line, respectively; and a first light emitting element through a fourth light emitting element connected to the first pixel circuit through the fourth pixel circuit, respectively, wherein the data driving circuit provides a first color data signal to each of the first data line and the fourth data line, provides a second color data signal to the second data line, and provides a third color data signal to the third data line, wherein the first light emitting element and the fourth light emitting element emit light of a first color, the second light emitting element emits light of a second color, and the third light emitting element emits light of a third color, wherein the third light emitting element, the first light emitting element, the second light emitting element, and the fourth light emitting element are sequentially arranged in a first direction, and wherein the first light emitting element through the third light emitting element include a first extending line through a third extending line, respectively, the first extending line through the third extending line are connected to the first pixel circuit through the third pixel circuit through a first contact hole through a third contact hole, respectively, the first extending line and the second extending line extend from the first light emitting element and the second light emitting element, respectively, in a direction opposite to the first direction, and the third extending line extends from the third light emitting element in the first direction.

17. The electronic device of claim 16, wherein the fourth light emitting element includes a fourth extending line, and wherein the fourth extending line is connected to the fourth pixel circuit through a fourth contact hole.

18. The electronic device of claim 17, wherein the first contact hole is disposed between the first data line and the second data line, and wherein the second contact hole and the third contact hole are disposed between the second light emitting element and the third light emitting element.

19. The electronic device of claim 17, wherein the fourth extending line extends from the fourth light emitting element in the direction opposite to the first direction.

20. An electronic device comprising:

a processor configured to provide an image signal and a control signal; and a display module configured to display an image in response to the image signal and the control signal, wherein the display module comprising a display panel including a pixel, wherein the pixel comprises:

a first data line through a fourth data line;

a first pixel circuit through a fourth pixel circuit connected to the first data line through the fourth data line, respectively; and a first light emitting element through a fourth light emitting element connected to the first pixel circuit through the fourth pixel circuit, respectively, wherein each of the first data line and the fourth data line transfers a first color data signal, the second data line transfers a second color data signal, and the third data line transfers a third color data signal, wherein the first light emitting element and the fourth light emitting element emit light of a first color, the second light emitting element emits light of a second color, and the third light emitting element emits light of a third color, wherein the third light emitting element, the first light emitting element, the second light emitting element, and the fourth light emitting element are sequentially arranged in a first direction, and wherein the first light emitting element through the third light emitting element include a first extending line through a third extending line, respectively, the first extending line through the third extending line are connected to the first pixel circuit through the third pixel circuit through a first contact hole through a third contact hole, respectively, and the second contact hole and the third contact hole are disposed between the second light emitting element and the third light emitting element.

* * * * *